(12) United States Patent
Yushin et al.

(10) Patent No.: US 12,080,883 B2
(45) Date of Patent: Sep. 3, 2024

(54) ION PERMEABLE COMPOSITE CURRENT COLLECTORS FOR METAL-ION BATTERIES AND CELL DESIGN USING THE SAME

(71) Applicant: Sila Nanotechnologies Inc., Alameda, CA (US)

(72) Inventors: Gleb Yushin, Atlanta, GA (US); Eugene Michael Berdichevsky, Oakland, CA (US); Bogdan Zdyrko, Clemson, SC (US); Alexander Thomas Jacobs, Oakland, CA (US)

(73) Assignee: SILA NANOTECHNOLOGIES, INC., Alameda, CA (US)

(*) Notice: Subject to any disclaimer, the term of this patent is extended or adjusted under 35 U.S.C. 154(b) by 82 days.

(21) Appl. No.: 17/332,732

(22) Filed: May 27, 2021

(65) Prior Publication Data

US 2021/0288318 A1    Sep. 16, 2021

Related U.S. Application Data

(63) Continuation of application No. 14/725,784, filed on May 29, 2015, now Pat. No. 11,038,165.

(Continued)

(51) Int. Cl.
*H01M 4/38* (2006.01)
*H01M 4/134* (2010.01)
(Continued)

(52) U.S. Cl.
CPC ........... *H01M 4/386* (2013.01); *H01M 4/134* (2013.01); *H01M 4/136* (2013.01); *H01M 4/364* (2013.01); *H01M 4/366* (2013.01); *H01M 4/58* (2013.01); *H01M 4/62* (2013.01); *H01M 4/66* (2013.01); *H01M 4/661* (2013.01); *H01M 4/668* (2013.01);
(Continued)

(58) Field of Classification Search
CPC ...... H01M 4/386; H01M 4/134; H01M 4/136; H01M 4/366; H01M 4/58; H01M 4/66; H01M 4/661; H01M 4/668; H01M 4/72; H01M 10/0445; H01M 10/0525;
(Continued)

(56) References Cited

U.S. PATENT DOCUMENTS

| 5,882,812 A | * | 3/1999 | Visco | H01M 4/13 429/50 |
| 6,007,588 A | * | 12/1999 | Mitchell | H01M 4/0404 29/623.5 |

(Continued)

FOREIGN PATENT DOCUMENTS

| CN | 101207198 A | * | 6/2008 | ............... B22F 1/02 |
| WO | WO-2012137613 A1 | * | 10/2012 | ............... B05D 5/12 |

OTHER PUBLICATIONS

Machine translation of CN101207198A (Year: 2008).*

*Primary Examiner* — Eugenia Wang
(74) *Attorney, Agent, or Firm* — MUNCY, GEISSLER, OLDS & LOWE, P.C.; Daniel Podhajny

(57) ABSTRACT

A Li-ion battery cell, among other materials, components, and techniques, is provided that includes ion-permeable anode and cathode electrodes, an electrolyte ionically coupling the anode and the cathode, a separator electrically separating the anode and the cathode, and a sacrificial, high-capacity Li composition for providing Li to at least one of the electrodes.

21 Claims, 32 Drawing Sheets

EXAMPLES OF Si-COMPRISING ANODE ON Li-ION PERMEABLE METAL FOILS

Related U.S. Application Data

(60) Provisional application No. 62/004,329, filed on May 29, 2014.

(51) Int. Cl.

| | |
|---|---|
| *H01M 4/136* | (2010.01) |
| *H01M 4/36* | (2006.01) |
| *H01M 4/58* | (2010.01) |
| *H01M 4/62* | (2006.01) |
| *H01M 4/66* | (2006.01) |
| *H01M 4/72* | (2006.01) |
| *H01M 10/04* | (2006.01) |
| *H01M 10/0525* | (2010.01) |
| *H01M 10/0587* | (2010.01) |

(52) U.S. Cl.
CPC ......... *H01M 4/72* (2013.01); *H01M 10/0445* (2013.01); *H01M 10/0525* (2013.01); *H01M 10/0587* (2013.01)

(58) Field of Classification Search
CPC ........... H01M 10/0587; H01M 10/052; H01M 4/264; H01M 4/62
See application file for complete search history.

(56) References Cited

U.S. PATENT DOCUMENTS

| | | | | |
|---|---|---|---|---|
| 2003/0192170 | A1* | 10/2003 | Jan | H01M 10/0431 29/623.5 |
| 2005/0118508 | A1* | 6/2005 | Yong | H01M 4/139 429/246 |
| 2008/0145761 | A1* | 6/2008 | Petrat | C23C 16/24 427/58 |
| 2009/0246626 | A1* | 10/2009 | Tasaki | H01M 4/80 429/208 |
| 2012/0100438 | A1* | 4/2012 | Fasching | H01M 4/0428 429/246 |
| 2013/0149608 | A1* | 6/2013 | Kim | H01M 10/0525 429/223 |
| 2013/0189566 | A1* | 7/2013 | Zinck | H01M 4/485 429/163 |
| 2013/0323527 | A1* | 12/2013 | Matsunaga | C25D 1/04 428/605 |
| 2014/0356721 | A1* | 12/2014 | Zhou | H01M 10/0525 429/246 |

\* cited by examiner

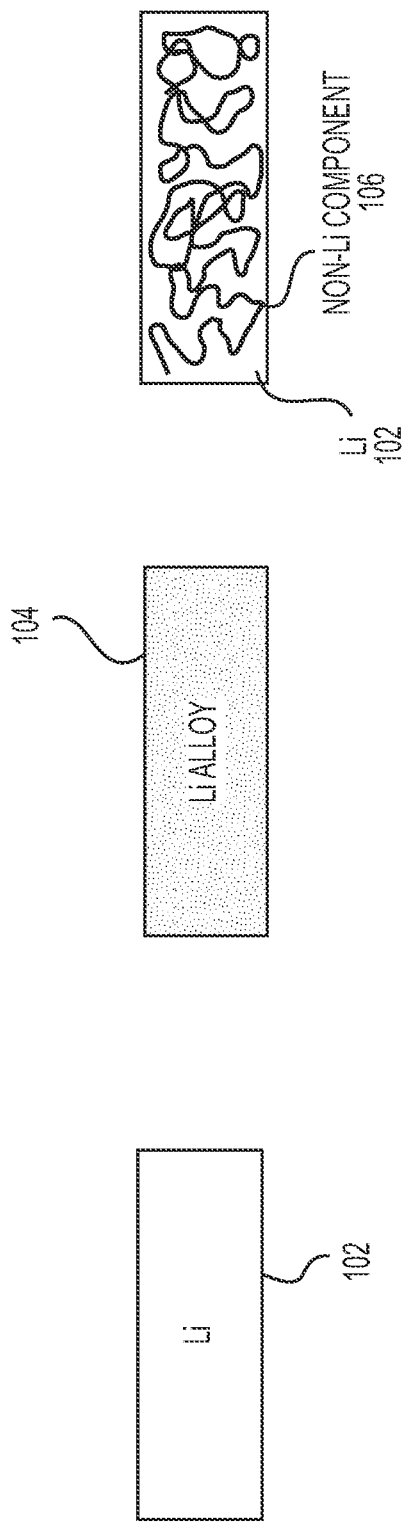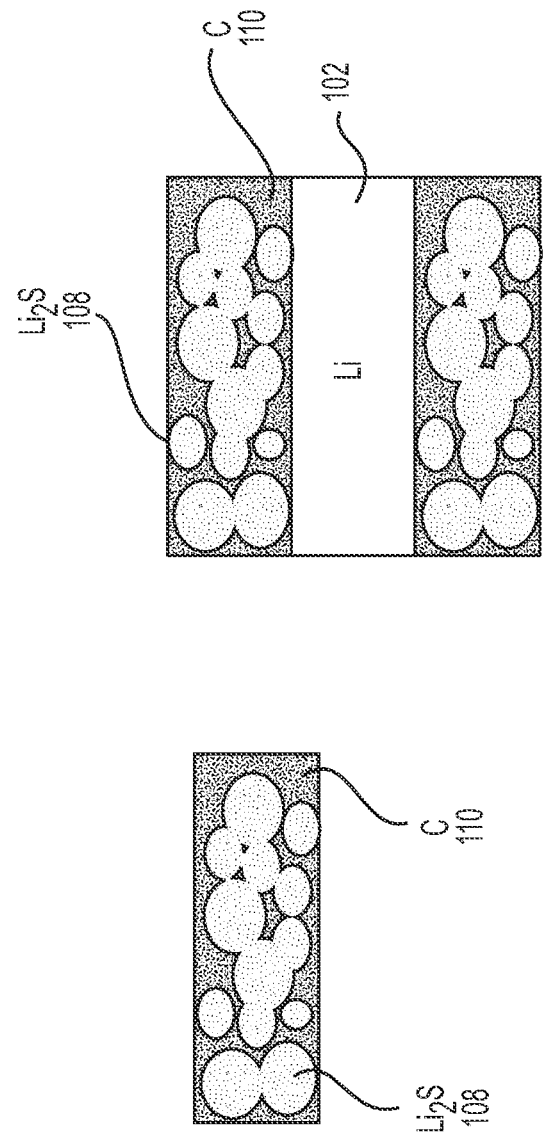

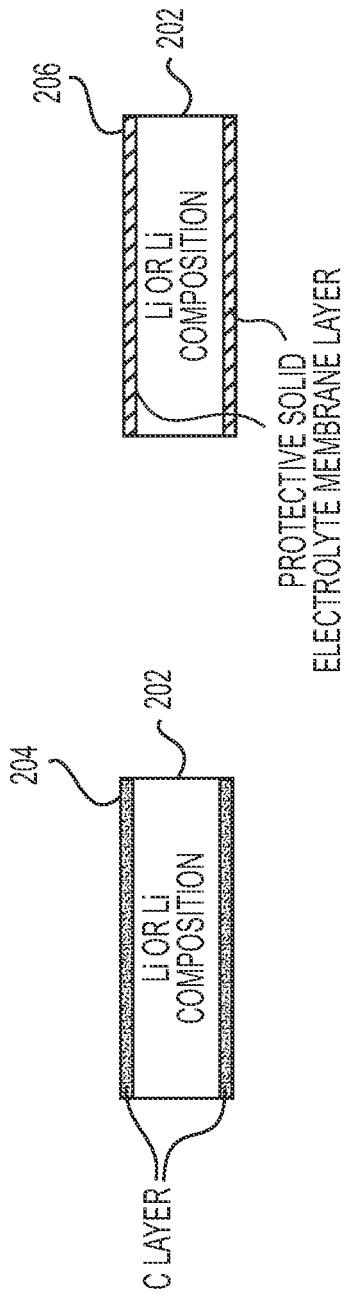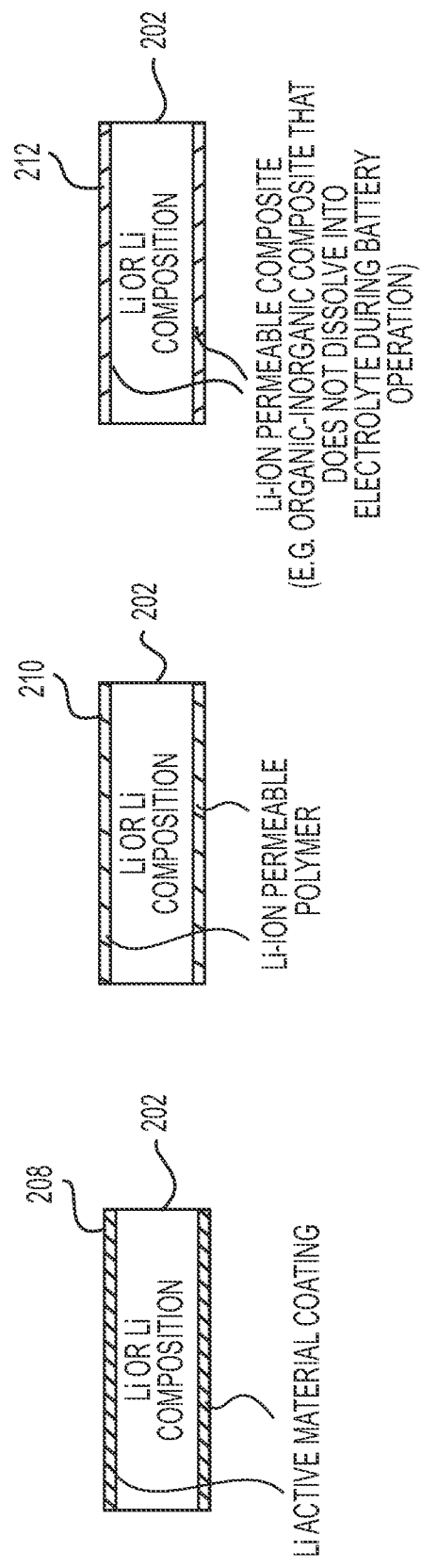

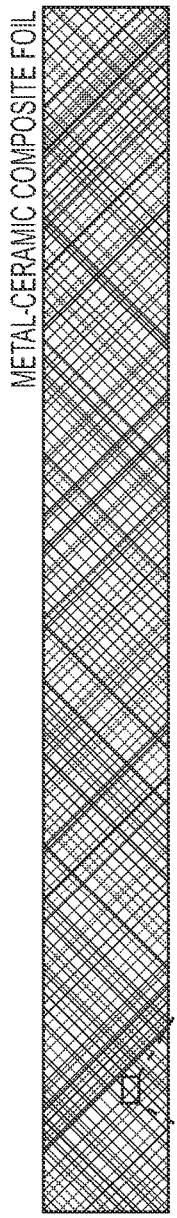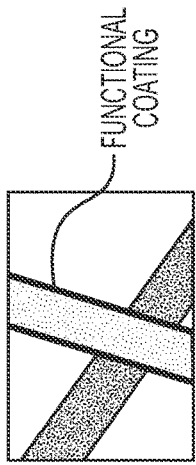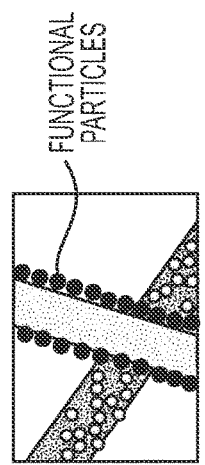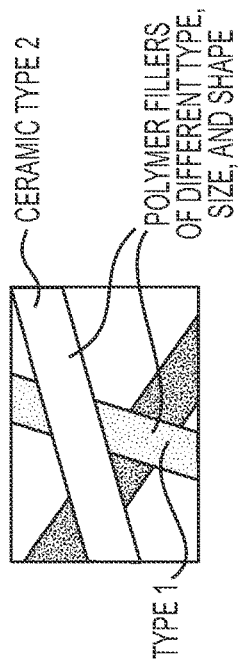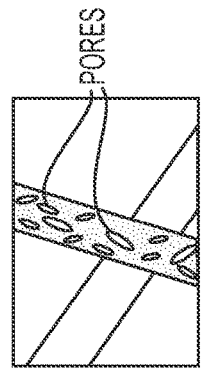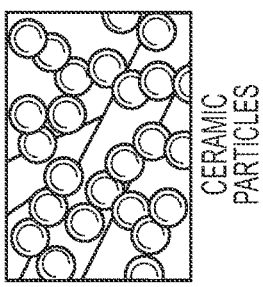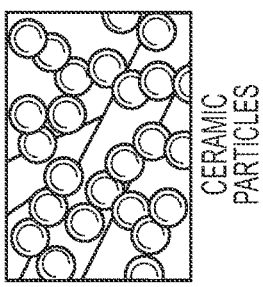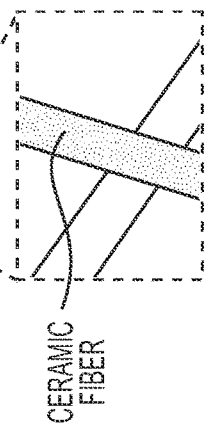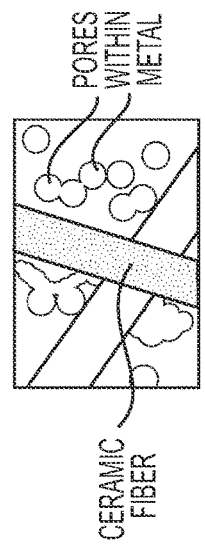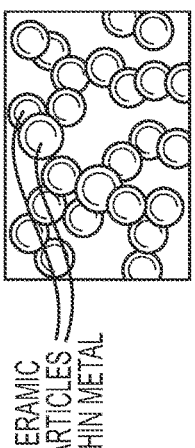

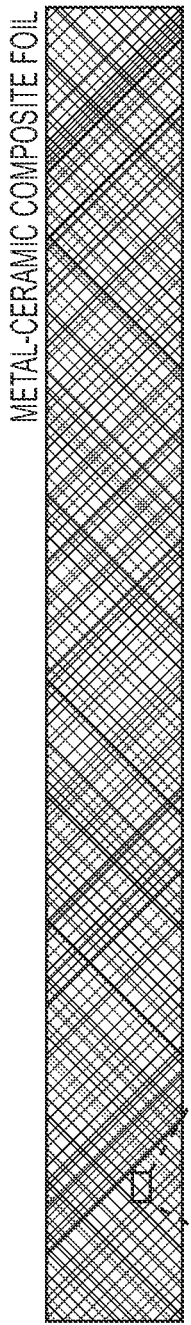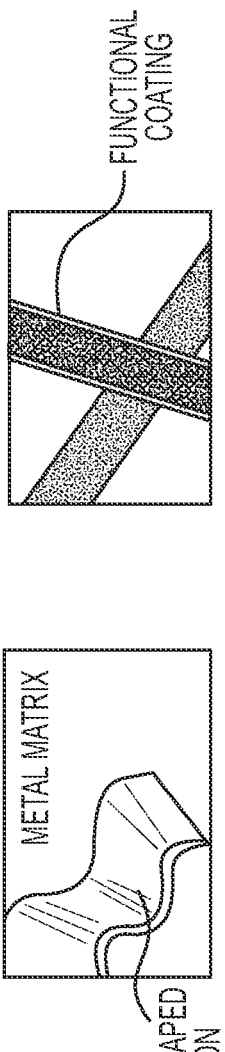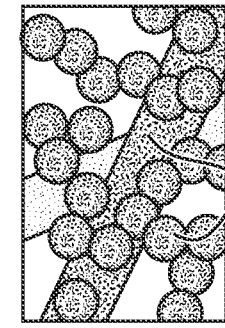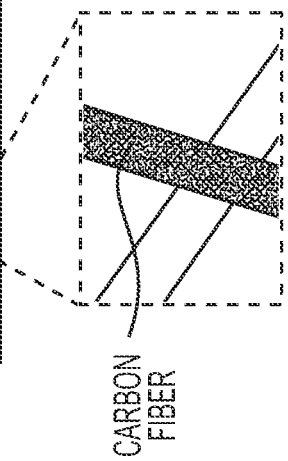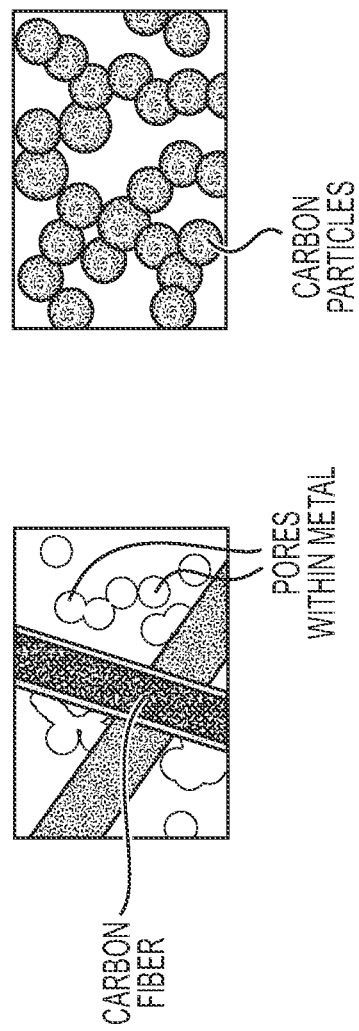

SCHEMATIC CROSS-SECTIONS OF EXAMPLE METAL FOILS

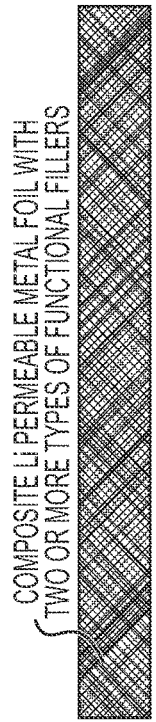

Li PERMEABLE COMPOSITE METAL FOIL

FIG. 16A

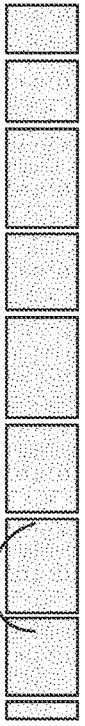

COMPOSITE Li PERMEABLE METAL FOIL WITH TWO OR MORE TYPES OF FUNCTIONAL FILLERS

FIG. 16B

POROUS COMPOSITE METAL FOIL

FIG. 16C

SMALL THROUGH CHANNELS WITHIN METAL FOIL

FIG. 16D

SMALL THROUGH CHANNELS WITHIN COMPOSITE METAL FOIL

FIG. 16E

METAL FOIL WITH POROUS AREAS

FIG. 16F

PORES
FILLERS
METAL FOIL WITH AREAS CONTAINING FUNCTIONAL FILLERS AND AREAS CONTAINING PORES

FIG. 16G

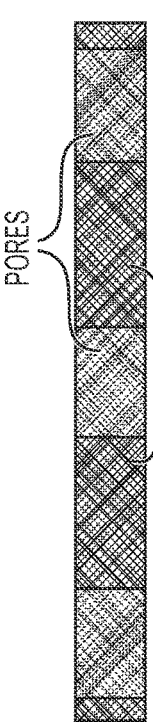

COMPOSITE METAL FOIL WITH PORE-CONTAINING AREAS

FIG. 16H

SCHEMATIC TOP VIEW OF SELECTED EXAMPLE METAL FOILS
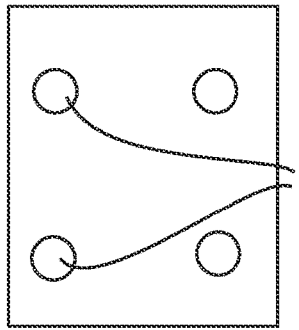
*FIG. 17A* — DIFFERENT TYPES OF FUNCTIONAL FILLERS
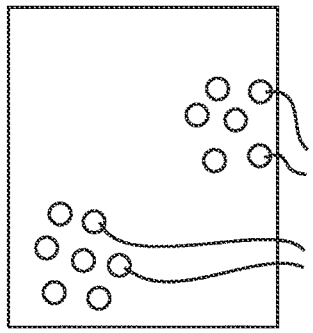
*FIG. 17B* — THROUGH CHANNELS OR PORES
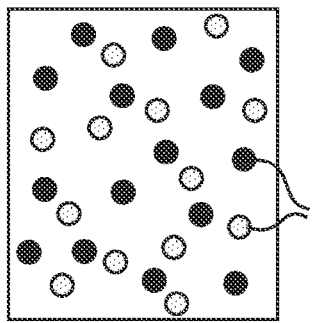
*FIG. 17C* — THROUGH CHANNELS
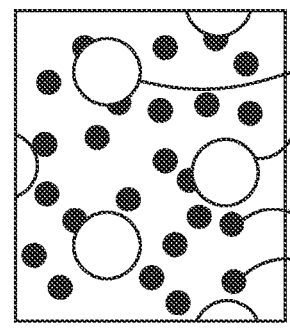
*FIG. 17D* — FUNCTIONAL FILLERS THROUGH CHANNELS OR PORES
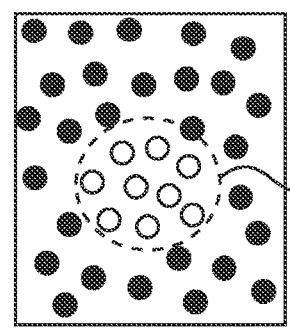
*FIG. 17E* — AREA OF THROUGH CHANNELS OR PORES WITHIN METAL MATRIX COMPOSITE FOIL
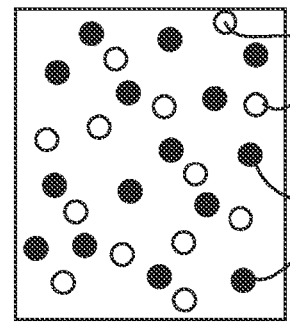
*FIG. 17F* — FUNCTIONAL FILLERS THROUGH CHANNELS OR PORES EXAMPLE OF SUITABLE Si-COMPRISING ANODE PARTICLE DESIGNS EXAMPLES OF SUITABLE METAL FLUORIDE ($MF_x$)-COMPRISING CATHODE PARTICLE DESIGNS

ION PERMEABLE COMPOSITE CURRENT COLLECTORS FOR METAL-ION BATTERIES AND CELL DESIGN USING THE SAME

CROSS REFERENCE TO RELATED APPLICATIONS

The present application for patent is a Continuation of U.S. patent application Ser. No. 14/725,784 entitled "ION PERMEABLE COMPOSITE CURRENT COLLECTORS FOR METAL-ION BATTERIES AND CELL DESIGN USING THE SAME," filed on May 29, 2015, issued Jun. 15, 2021 as U.S. Pat. No. 11,038,165, which in turn claims the benefit of U.S. Provisional Application No. 62/004,329, entitled "Ion Permeable Composite Current Collectors for Metal-Ion Batteries and Cell Design using the Same," filed May 29, 2014, each of which is expressly incorporated herein by reference in its entirety.

BACKGROUND

Field

The present disclosure relates generally to energy storage devices, and more particularly to metal-ion battery technology and the like.

Background

Among the metal-ion batteries, Li-ion battery technology has achieved the greatest commercial success, owing to the very high gravimetric capacity (3860 mAh/g) and moderately high volumetric capacity (2061 Ah/L) of Li anodes combined with the high activity of Li and the high mobility of Li ions in various hosts.

Yet, other metal-ion batteries may also offer reasonably high volumetric and gravimetric energy densities. For example, the gravimetric specific capacity of Al (2980 mAh/g, calculated based on the three-electron oxidation of Al) is close to that of Li, while its volumetric storage capacity (8043 Ah/L) is four times higher than that of Li, due to the fivefold higher density of Al. The excellent storage capacity of Al combined with its broad availability (Al is the most abundant metal in the Earth's crust, contributing to over 8% of the total mass) and low cost, makes it an attractive anode material. Similarly, Mg, for example, is nearly as abundant as Al, but it is more active than Al and has high gravimetric (2233 mAh/g) and volumetric (3885 Ah/L) specific storage capacities. K-ion, Na-ion and Ca-ion batteries may also offer some advantages in selected applications. Finally, batteries that combine metal cations and non-metal anions may also be utilized in various applications.

Fully dense Al foil and Cu foil are commonly used as current collectors for Li-ion battery cathodes and anodes, respectively. However, dense foils are heavy, which increases the mass of Li-ion batteries. A porous structure of the Al and Cu current collector foils, in contrast, would (i) reduce the weight of these foils, (ii) sometimes improve adhesion of a Li-ion battery active material to the foil current collectors and (iii) allow such current collectors to incorporate active material within its pores for enhanced electrical conductivity. Equally importantly, (iv) porous Al and Cu current collectors generally allow for a relatively fast Li transport though the electrodes (deposited on such foils), which may be advantageous in some applications.

Good mechanical properties of both dense and porous Al and Cu foils is important for producing high quality batteries with a low number of defects. This becomes even more important when the foils are sufficiently thin. In fact, in many commercial cells the thickness of Cu foils is in excess of 10-12 microns. Thinner Cu foils, for example, may be sufficient for carrying the desired current density, but they suffer from insufficiently good mechanical properties (such as low resistance to various elastic and plastic deformations). During calendaring (electrode densification), for example, thinner foils may even form large defects (e.g., ruptures or voids) that lead to local heating and battery failure. Porous foils may suffer from even worse mechanical properties.

Conventional methods for producing such porous Al and Cu foils include: (1) masking the surface of a substrate in a desired pattern with an insulating film, though which electrolytic plating is conducted onto a non-sticking substrate; (2) perforating a non-porous metal foil by etching or mechanical machining; (3) preferential electrolytic plating along the network of cracks of a cracked non-sticking surface; (4) sintering metal powders or fibers; and (5) calendaring metal foam sheets.

For example, it has been proposed to form a porous copper foil through electroplating such that copper grains having an average grain size with respect to a direction perpendicular to the thickness of the foil of 1-50 µm are two-dimensionally bonded to one another. It has also been proposed to form a porous metal structure for a battery that has a porous fiber structure or three dimensional structure produced from sintering metal powder or metal fibers. It has also been proposed to form a similar porous metal structure where the main frame that surrounds the pores is formed of entangled metal fibers, and the fibers are directly melt-bonded. It has also been proposed to form an electrolytically-produced porous metal foil having a three-dimensional network structure containing through-pores, the foil being produced by the steps of electroplating by use of a drum cathode and an anode to thereby form a metal foil layer on the drum cathode; and peeling the foil layer from the cathode. It has also been proposed to form a porous metal foil having a two-dimensional network structure composed of a metal fiber by preferential electrolytic plating along the network of cracks of a cracked non-sticking surface.

However, these conventional methods of porous Al and Cu metal foil production for Li-ion battery applications are generally too expensive. In addition, the metal foils suffer from poor mechanical properties. Finally, while incorporating active material within the porous Al and Cu foil structure may provide some advantages in terms of better electrical conductivity and higher rate performance, this approach also suffers from limitations, such as reduced control over the uniformity of the electrodes. For example, if the intention is to mostly deposit an active material coating on the surface (not within the pores) of porous Al and Cu foils, an overly large size of some of the pores may result in non-uniformities within the slurry-based electrode coatings (e.g., if some of the pores are larger than the size of some of the active particles, as could be the case for techniques that induce large pore sizes and broad pore size distribution). This is because in one location of the produced electrode a significant portion of the active material may be incorporated into the pores, while in another location most of the active material remains on the surface of the porous Al or Cu foils. These deviations in local mass loading of active material (active material mass per unit area of the foils) may induce Li plating and cell degradation. As a result, commercial cells do not typically utilize such porous Al and Cu foils in their construction, in spite of such foils offering reduced weight and improved electrode adhesion.

Electrolytic pre-doping of positive and negative electrodes with Li has been discussed for use in electrochemical capacitors and Li-ion cells. In the case of an electrochemical capacitor, Li is induced to either modify a potential of at least one electrode or induce high Li content into an active material that does not contain any amount (or sufficient amount) of Li in the as-produced form. In the case of a Li-ion battery, Li pre-doping has been described to either compensate for the irreversible loss of Li on the first cycle during the formation of a solid electrolyte interphase (SEI) on a negative (graphite) electrode or to insert Li into one of the electrodes, in the case when both electrode materials contain no Li.

For example, it has been proposed to pre-dope two electrodes for the manufacturing of an electrochemical capacitor with improved energy density. It has also been proposed to place Li foil inside a case body of a Li-ion battery to electrically connect Li metal to an anode, inducing "short circuit" electrolytic Li insertion into an anode material. All metal Li is consumed during this process. Somewhat similarly, it has also been proposed to use a thin Li metal plate disposed on an anode and shielded from a cathode using a second layer of a negative electrode material that no longer exists after the first cycle and Li doping of an anode. It has also been proposed to reduce the first cycle losses during SEI formation by using a Li-containing compound instead of a Li metal. It has also been proposed to Li dope active material by mixing it together with a solvent and Li before making an electrode. It has also been proposed to prepare and use several types of stabilized metal powders (instead of a Li foil) for the direct deposition on an electrode and the resulting "short circuit" electrolytic Li insertion into an electrode in the presence of an electrolyte.

Such conventional methods of pre-doping suffer from multiple limitations in terms of the reduced safety, significantly increased cost, significantly increased time of a Li cell preparation and, in some cases, reduced cell performance. For example, the use of stabilized Li metal powders or thin Li foils for the direct deposition on the current collectors induces safety hazards because during the deformation of these foils or powders on the electrode surface by applying mechanical pressure, one exposes a high surface area of fresh Li to an oxygen-containing environment of a dry room, thus inducing a highly exothermic reaction of Li oxidation. Such a reaction is known to cause fires. The mechanical pressure is applied in order to both compress or densify these electrodes and simultaneously induce cracks within the nonconductive surface layer in a stabilized Li powder or Li foil to establish an electrical connection between the Li supply and an electrode and release Li ions for doping. Preparation of such electrodes in an oxygen-free environment (e.g., in an Argon gas-filled glovebox), eliminates the fire hazard, but significantly increases the production costs. Mixing an electrode material with Li prior to assembling the anode, at the same time, also requires the use of small particles of Li, which may induce fires in a dry room. Furthermore, after doping, an anode potential is reduced to below 1 V vs. Li/Li+, making such anodes very reactive in contact with an oxygen containing environment. This is particularly true for anodes containing small particles (below 3 micron) due to the high surface area of such electrodes. The reaction between the Li doped anode particles and oxygen-containing dry room environment may similarly induce undesirable oxidation reactions on the electrode surface, electrode heating, and fires. The methods of pre-doping of the whole electrode in a separate electrolytic bath will similarly make an electrode very reactive in any oxygen-containing environment. In addition, it will require a separate step of Li doping and additional electrode handling, which further increases the cell production cost. Doping of Li from a Li metal electrode additionally induces formation of Li dendrites, which may electrically connect to an electrode (being doped), causing local short-circuit Li insertion, which is uncontrolled and not uniform. So-called "short-circuit Li doping" (e.g., when Li is directly connected to an anode) may result in a poor and non-uniform formation of the so-called solid electrolyte interphase (SEI) layer on the anode surface, because such Li doping takes place at different rates across the electrode (e.g., faster for the portion of the anode that is in a direct contact with Li) and overly fast rates are known to induce a less stable and more fluffy SEI. Poor quality of such an SEI layer results in faster Li-ion battery degradation. Additionally, because Li transport through metal foils is a very slow process, doping the regular electrodes (active powders mixed with binders and conductive additives, deposited on dense Cu (for an anode) or dense Al (for a cathode) foils) will either require multiple sources of Li (one source of Li, such as a Li foil or Li sheet, for each side of an electrode to be doped) or will be extremely slow processes, which will significantly increase the cell production time and cost.

Overall, the current construction, components, materials, and processes for metal-ion (such as Li-ion) cell manufacturing do not provide desirably high cell energy density, desirably low cell cost, desirably high uniformity, desirably long cycle life, or good performance characteristics.

Accordingly, there remains a need for improved metal-ion batteries, components, and other related materials and manufacturing processes.

SUMMARY

Embodiments disclosed herein address the above stated needs by providing improved metal-ion (such as Li-ion) battery components, improved batteries made therefrom, improved metal-ion (such as Li-ion) cell construction, and methods of making and using the same. Such metal-ion batteries facilitate the incorporation of advanced material synthesis and electrode fabrication technologies, and enable fabrication of metal-ion batteries with increased energy density and at a cost (on a cost-per energy basis) lower than that of conventional metal-ion battery technology.

As an example, a Li-ion battery cell is provided that includes ion-permeable anode and cathode electrodes, an electrolyte ionically coupling the anode and the cathode, a separator electrically separating the anode and the cathode, and a sacrificial, high-capacity Li composition for providing Li to at least one of the electrodes.

The high-capacity Li composition may include, for example, at least 60% Li atoms.

The high-capacity Li composition may be connected to a current collector that is electrically separated from each of the anode and cathode electrodes.

The high-capacity Li composition may include a surface coating that protects the high-capacity Li composition from interaction with dry air. As an example, the surface coating may include a polymer layer that swells in electrolyte solvent.

The high-capacity Li composition may include first and second, physically separated high capacity Li compositions.

The cell may be cylindrical and the high-capacity Li composition may (i) have a rod shape or a cylinder shape and be located in the center of the cell and/or (ii) have a cylinder shape and be located in the periphery of the cell.

The cell may be a pouch cell or a prismatic cell.

At least one of the ion-permeable electrodes may include an ion-permeable current collector that (i) has a thickness below about 20 microns and (ii) comprises pores or through channels making up from about 1% to about 20% of the cross-sectional area of the current collector.

At least one of the ion-permeable electrodes may include an ion-permeable current collector having pores with a size in the range of about 0.01 to about 20 microns.

At least one of the ion-permeable electrodes may include an ion-permeable current collector that comprises a filler material. As an example, the filler material may include a polymer or a polymer mixture. The polymer may exhibit a Li-ion conductivity of at least 10-6 S/cm. The polymer may be a block co-polymer. As another example, the filler may include ceramic particles of an elongated shape.

The ion-permeable anode may include an active material including Si. The ion-permeable anode may include an active material that exhibits a capacity of at least 400 mAh/g. The ion-permeable cathode may include an active material including a metal fluoride.

At least one of the ion-permeable electrodes may include holes through the electrode.

At least one of the ion-permeable electrodes may include an ion-permeable current collector produced using a process that involves electrodeposition.

BRIEF DESCRIPTION OF THE DRAWINGS

The accompanying drawings are presented to aid in the description of embodiments of the invention and are provided solely for illustration of the embodiments and not limitation thereof.

FIGS. 1A-1E provide selected examples of various Li compositions that may be used as a source of Li doping or Li insertion into the electrodes.

FIGS. 2A-2E provide examples of protective layer(s) of Li compositions, which may assist in safer handling of Li composition in a dry-room environment and/or assist in reducing the roughness of the Li composition during extraction of Li for doping.

FIGS. 13A-13J illustrate several examples of electrically conductive composite Al-ceramic, Cu-ceramic foils that allow for fast Li-ion transport across the foils.

FIGS. 14A-14G illustrate several examples of electrically conductive composite Al-carbon, Cu-carbon foils that allow for fast Li-ion transport across the foils.

FIGS. 16A-16H illustrate schematic cross-sections of several examples of Li ion-permeable, electrically conductive Al-filler and Cu-filler composite foils with or without through channels and pores, that allow for fast Li-ion transport across the foils.

FIGS. 17A-17F illustrate schematic top views of several examples of Li ion-permeable, electrically conductive Al-filler and Cu-filler composite foils with or without through channels and pores, that allow for fast Li-ion transport across the foils.

DETAILED DESCRIPTION

Figure 3:
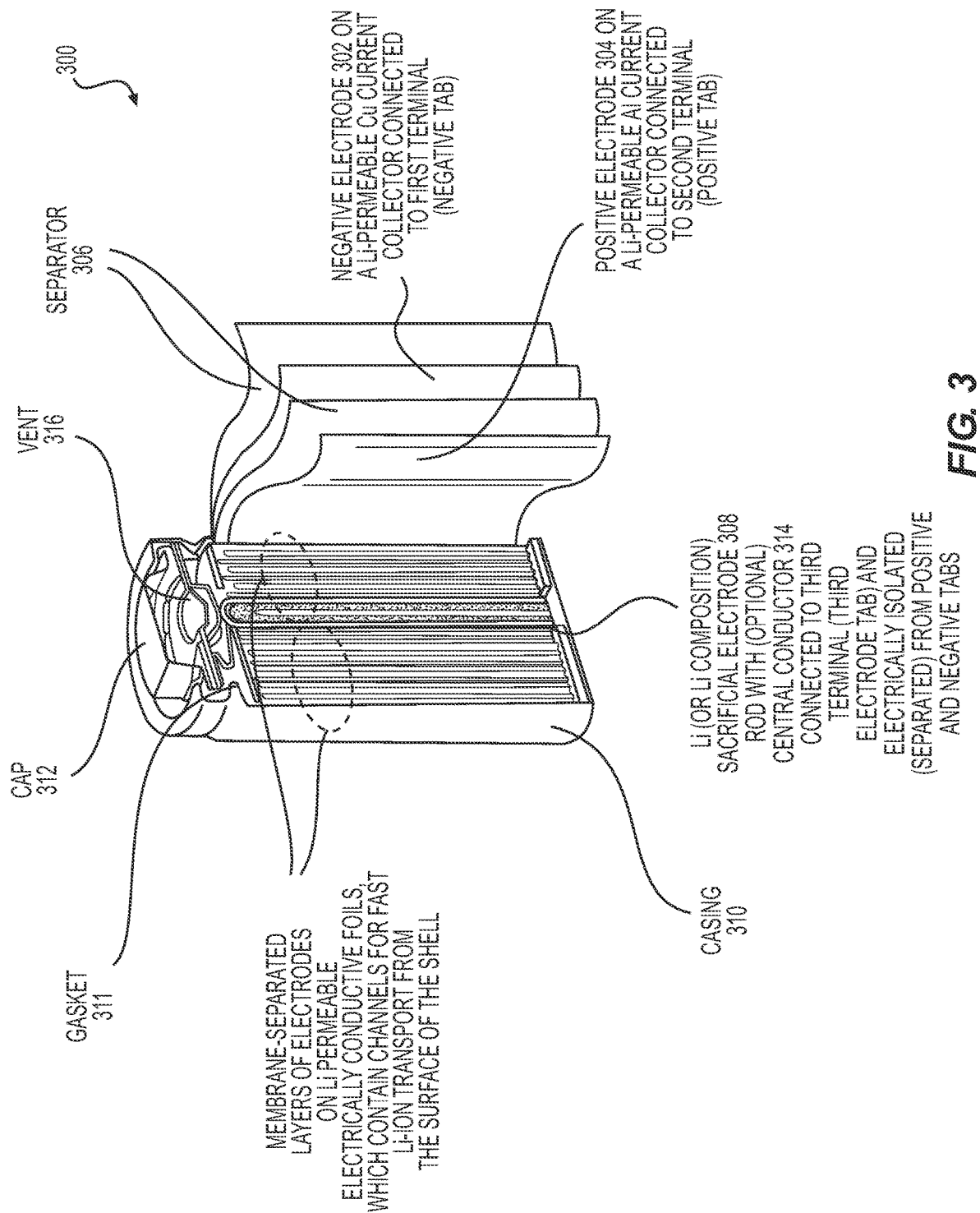
FIG. 3 illustrates a design of a cylindrical cell.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

In the description below, several examples are provided in the context of Li-ion batteries because of the current prevalence and popularity of Li-ion technology. However, it will be appreciated that such examples are provided merely to aid in the understanding and illustration of the underlying techniques, and that these techniques may be similarly applied to various other metal-ion batteries, such as Na-ion, Ca-ion, K-ion, Mg-ion, and other metal-ion batteries.

An increase in the energy density of a high capacity metal-ion (such as Li-ion) battery may be achieved by doping its electrodes with the metal ions of interest (e.g., Li ions in the case of a Li-ion battery). It may be advantageous for such a doping procedure to be conducted after the battery is constructed, because such a cell fabrication protocol reduces the cost and increases safety of the doped cell manufacturing.

In one embodiment, metal ions (such as Li ions) required for the doping may be taken from "high capacity Li compositions," which may be termed "sacrificial" electrode(s). Such electrodes normally do not participate in charge-discharge of the cells. Instead, they serve to provide Li to anodes or cathodes. In addition, such electrodes may be used to analyze the independent "state of health" of each electrode (e.g., an anode) during battery operation. This analysis may involve the exchange of a small amount of Li between an electrode of choice (anode or cathode) at a given state of charge (e.g., for a fully charged cell or for a discharged cell) and the high capacity Li compositions. By measuring the potential difference between the electrode of choice and this sacrificial electrode during the Li-ion exchange, the degradation of each electrode in the cell can be deduced independently. Furthermore, if such an analysis reveals that some of the Li in the anode or cathode is irreversibly lost in side reactions, the losses may be further compensated by taking more Li from the sacrificial electrode.

FIGS. 1A-1D provide selected examples of various Li compositions that may be used as a source of Li doping or Li insertion into the electrodes.

It may be advantageous for the high capacity Li composition to exhibit a volumetric capacity in excess of 1000 mAh/cc, preferably above 1200 mAh/cc. In some applications it may also be advantageous for the Li composition to comprise more than 50% of Li atoms. Several materials may be used for this purpose. Examples include but are not limited to: pure Li (as shown in FIG. 1A, including a Li composition 102); a Li alloy (as shown in FIG. 1B, including a Li alloy composition 104); a Li or Li alloy comprising a non-Li composition (e.g., carbon, copper, nickel, iron, etc.) (as shown in FIG. 1C, including a Li composition 102 and a non-Li component 106 of the composite); a $Li_2S$-carbon composite (as shown in FIG. 1D, including $Li_2S$ 108 embedded within a conductive carbon 110); various multi-layered arrangements (, as shown in FIG. 1E, including Li 102 sandwiched between or enclosed within a $Li_2S$ 108-carbon 110 composite layer, or Li alloy layer); various combinations of high capacity Li containing materials; etc.

It may also be advantageous for the high capacity Li composition to: (i) exhibit relatively small Li dendrite growth (or none at all) and retain a smooth Li surface during Li atom extraction, and (ii) be protected from $O_2$ (ideally also from $H_2O$) in the environment. In some embodiments, the sacrificial electrode may be coated with a Li-permeable layer(s) that either reduces Li dendrite growth or protects it from oxidation, or both.

FIGS. 2A-2E illustrate examples of suitable protective coatings, which may include but are not limited to: carbon (as shown in FIG. 2A, including a carbon coating 204); a solid electrolyte membrane layer (as shown in FIG. 2B, including a protective solid electrolyte membrane 206, such as a ceramic electrolyte, polymer electrolyte, or polymer-ceramic composite layer); a Li active material coating (as shown in FIG. 2C, including a Li active material coating 208, such as lithium phosphate, lithium fluoride, etc.); a polymer layer permeable to Li-ions when emerged in electrolyte (as shown in FIG. 2D, including a L-ion permeable polymer 210, such as polyvinyl pyridine (PVP) or its derivatives); and a Li-ion permeable composite coating (as shown in FIG. 2E, including a L-ion permeable composite 212, such as an organic/inorganic composite that does not dissolve in the electrolyte during battery operation).

To reduce cell manufacturing time and cost, it may be advantageous for the Li doping to be conducted relatively fast (e.g., in less than 10 days). For the majority of relatively large (e.g., greater than about 1 $cm^2$) cells, this may require the use of Li-ion permeable electrodes so that Li can be supplied through the whole (anode-separator-cathode) stack. As such, it may be advantageous for the current collectors used for the electrode construction (e.g., Cu foil for the anodes or Al foil for the cathodes and some higher voltage anodes and other types of current collectors of suitable composition) to allow for a fast Li diffusion through them. For illustration purposes and due to the widespread use of these Cu foil anode current collectors and Al foil cathode current collectors for commercial Li-ion batteries, several examples are provided herein that use Cu, Cu alloy, or Cu-comprising current collectors for anodes and Al, Al alloy, or Al-comprising current collector for cathodes. However, other compositions of current collectors may also be used for certain battery chemistries (such as stainless steel or nickel). For example, for Na-ion batteries, Al current collectors may be used for both anodes and cathodes.

FIG. 3 illustrates an example embodiment in the form of a cylindrical cell. In this example, the cylindrical cell 300 includes electrodes permeable to Li ions (including a negative electrode 302 on a Li-permeable Cu current collector and a positive electrode 304 on a Li-permeable Al current collector), separator membrane layers 306, and a sacrificial electrode 308 of high capacity Li composition, enclosed by a casing 310, gasket 311, and cap 312. In this embodiment, the rod-shaped or cylinder-shaped sacrificial electrode is located in the center of the cell and may additionally contain a central conductor 314 in the form of (i) a metal wire or carbon fiber(s) in the center (in the case of a rod), (ii) a metal or carbon cylinder (in case of a cylindrical shape), or (iii) a metal or carbon mesh or porous foil or porous fabric in the perimeter. This sacrificial electrode may additionally comprise a hollow, gas permeable region that may serve as a "vent" 316.

The sacrificial electrode in this and other embodiments may be advantageously connected to a separate tab and be normally electrically insulated from both the anode and the cathode. However, it should be ionically connected to the electrodes via electrolyte to allow "doping" of at least one electrode with Li. In some applications, for example when essentially all Li from the "sacrificial electrodes" is used for doping during cell formation, it is permissible to electrically connect it to the anode. In this case, however, formation of the SEI on the anode may be inferior, because the rate of Li doping from the sacrificial electrode into the anode will be difficult to control.

Figure 4:
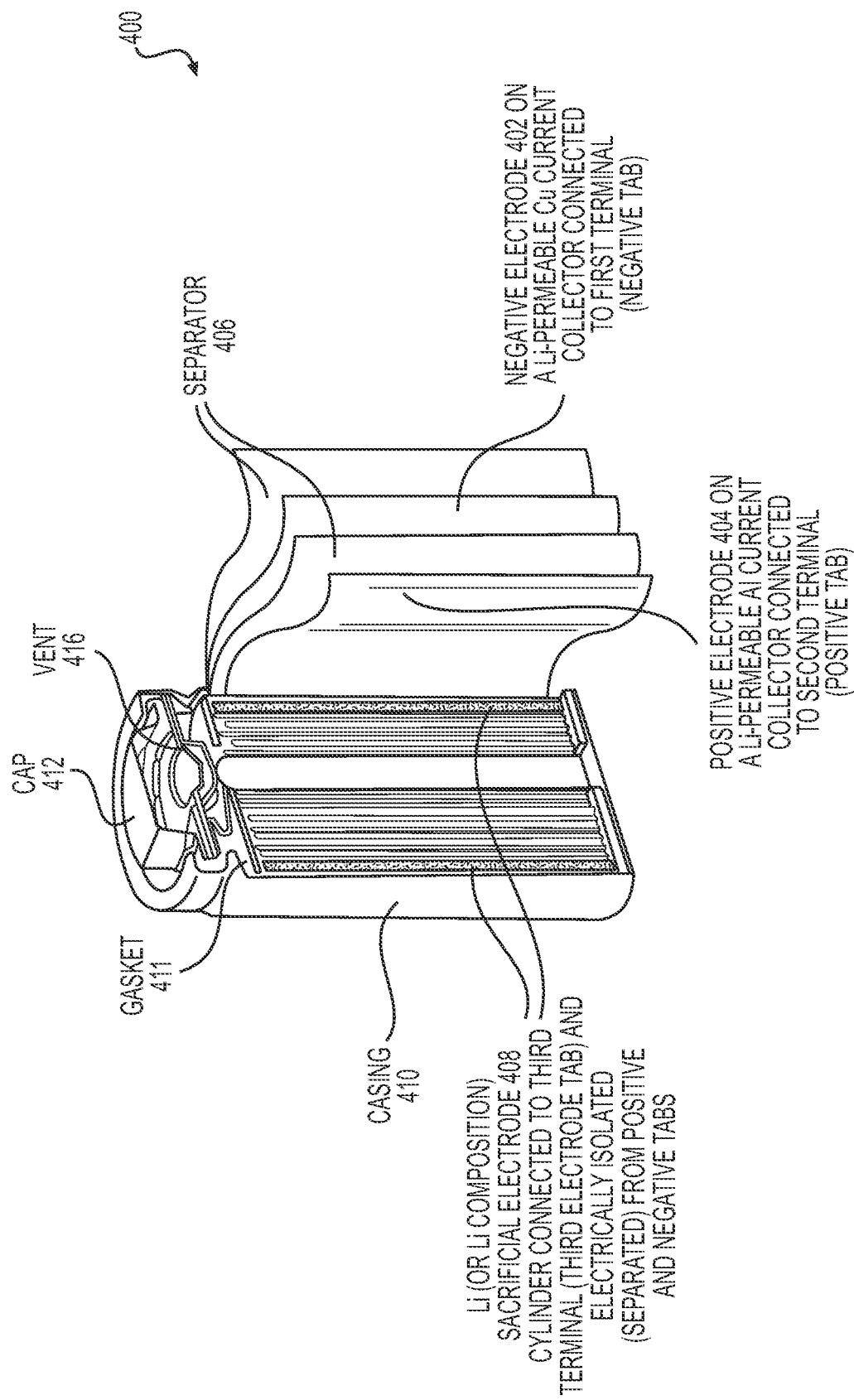
FIG. 4 illustrates another design of a cylindrical cell.

FIG. 4 illustrates another example embodiment in the form of a cylindrical cell. In this example, the cylindrical cell 400 includes electrodes permeable to Li ions (including a negative electrode 402 on a Li-permeable Cu current collector and a positive electrode 404 on a Li-permeable Al current collector), separator layers 406, and a sacrificial electrode 408 of high capacity Li composition, enclosed by a casing 410, gasket 411, and cap 412, with a vent 416. In this embodiment the cylinder-shaped sacrificial electrode is located in the perimeter of the cell and may additionally comprise a conductor in the form of an electrically conductive metal, carbon foil, or fabric. Similar to the design of FIG. 3, the sacrificial electrode may advantageously be connected to a separate tab and be electrically insulated from the anode and cathode tabs, but be ionically connected to the anode and cathode.

The cylindrical cell design with a sacrificial electrode may include two caps (one for positive and one for negative terminals) in order, for example, to physically separate two electrodes and enhance the safety characteristics of the cylindrical cell. The third terminal (tab) connected to the sacrificial electrode may be located either on the top or on the bottom cap or, in some designs, on both.

Figure 5:
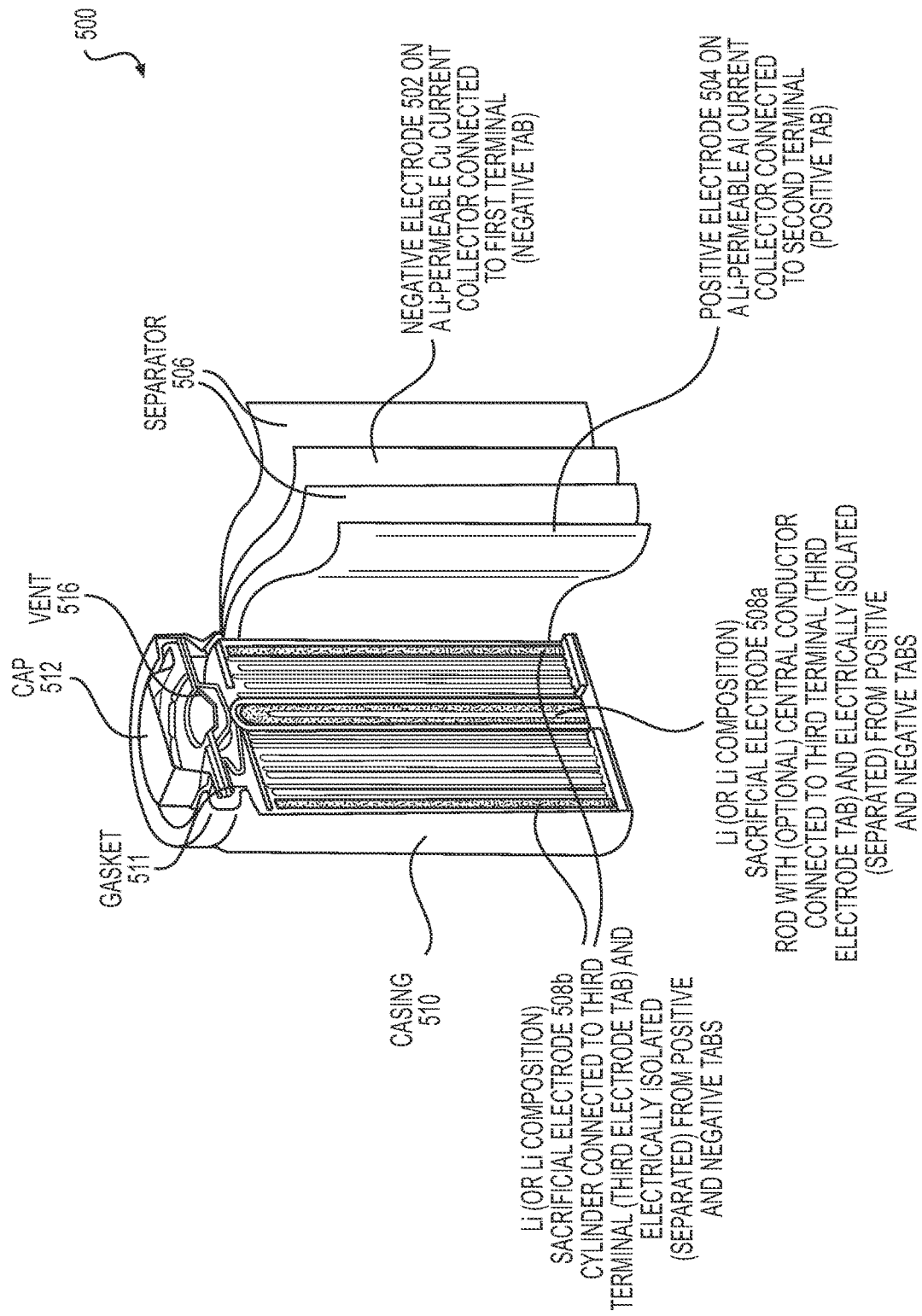
FIG. 5 illustrates another design of a cylindrical cell.

FIG. 5 illustrates another example embodiment in the form of a cylindrical cell. In this example, the cylindrical cell 500 includes electrodes permeable to Li ions (including a negative electrode 502 on a Li-permeable Cu current collector and a positive electrode 504 on a Li-permeable Al current collector), separator layers 506, and more than one sacrificial electrode 508a, 508b of high capacity Li composition, enclosed by a casing 510, gasket 511, and cap 512, with a vent 516. In this embodiment, one sacrificial electrode (illustrated as sacrificial electrode 508a) is located in the center of the cell and another (illustrated as sacrificial electrode 508b) in the perimeter. However, other useful configurations and utilization of more than two sacrificial electrodes may also be employed, such as when it is desirable to increase the rate of Li doping.

Figure 6:
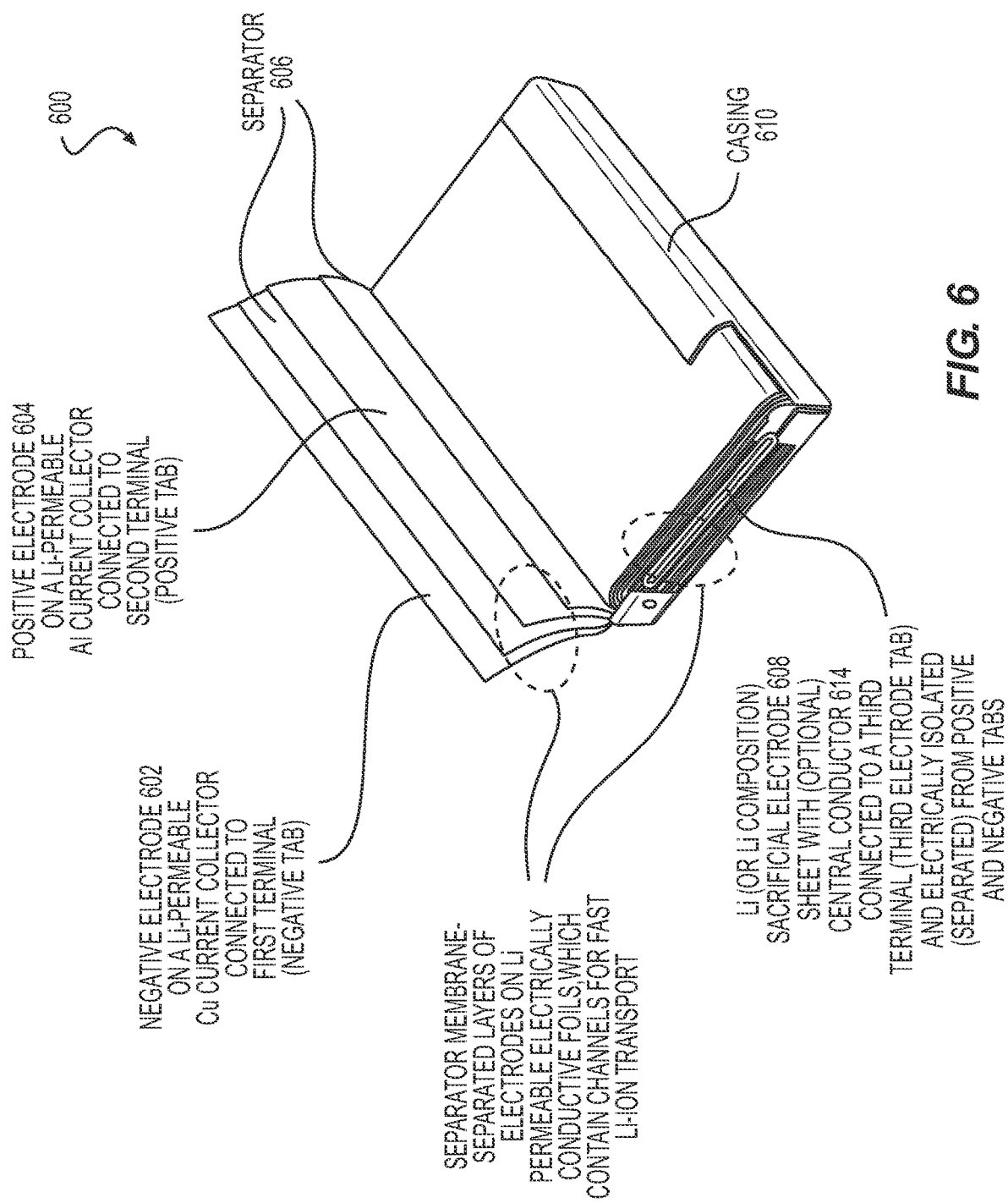
FIG. 6 illustrates a design of a prismatic cell.

FIG. 6 illustrates another embodiment in the form of a prismatic cell. In this example, the prismatic cell 600 includes electrodes permeable to Li ions (including a negative electrode 602 on a Li-permeable Cu current collector and a positive electrode 604 on a Li-permeable Al current collector), separator layers 606, and a sacrificial electrode 608 of high capacity Li composition approximately in the center of the cell, enclosed by a casing 610. In this embodiment, the sacrificial electrode is positioned at an equal distance from the furthest electrodes to be doped. It may also (optionally) include a central conductor 614.

Figure 7:
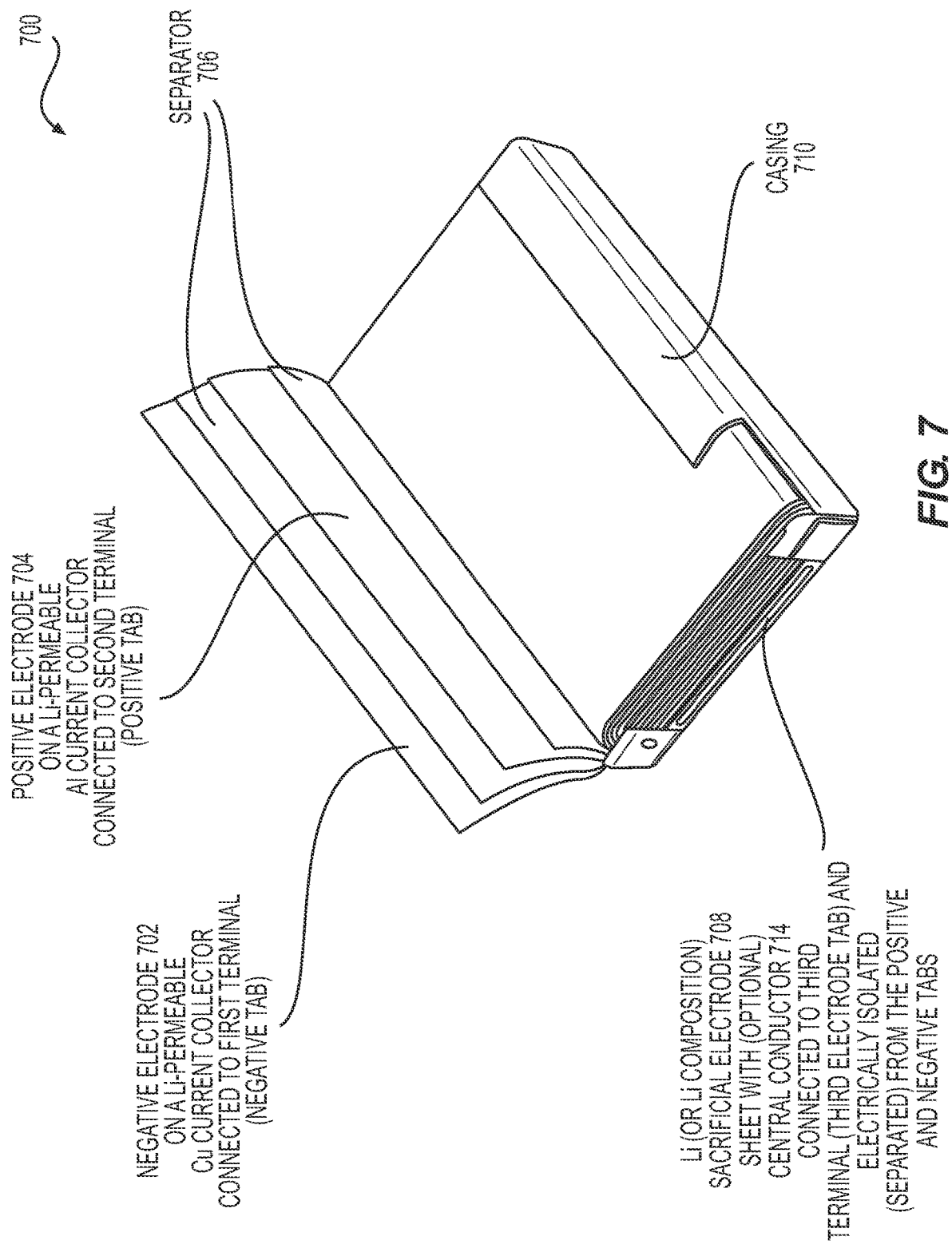
FIG. 7 illustrates another design of a prismatic cell.

FIG. 7 illustrates another embodiment in the form of a prismatic cell. In this example, the prismatic cell 700 includes electrodes permeable to Li ions (including a negative electrode 702 on a Li-permeable Cu current collector and a positive electrode 704 on a Li-permeable Al current collector), separator layers 706, and a sacrificial electrode 708 of high capacity Li composition on one side of the cell, enclosed by a casing 710. In this embodiment, cell construction may be slightly easier because placing the more dangerous and less oxidation tolerant sacrificial electrode may be the first or the last step, completely independent from the preparation of the rest of the electrodes. The sacrificial electrode may also (optionally) include a central conductor 714.

Figure 8:
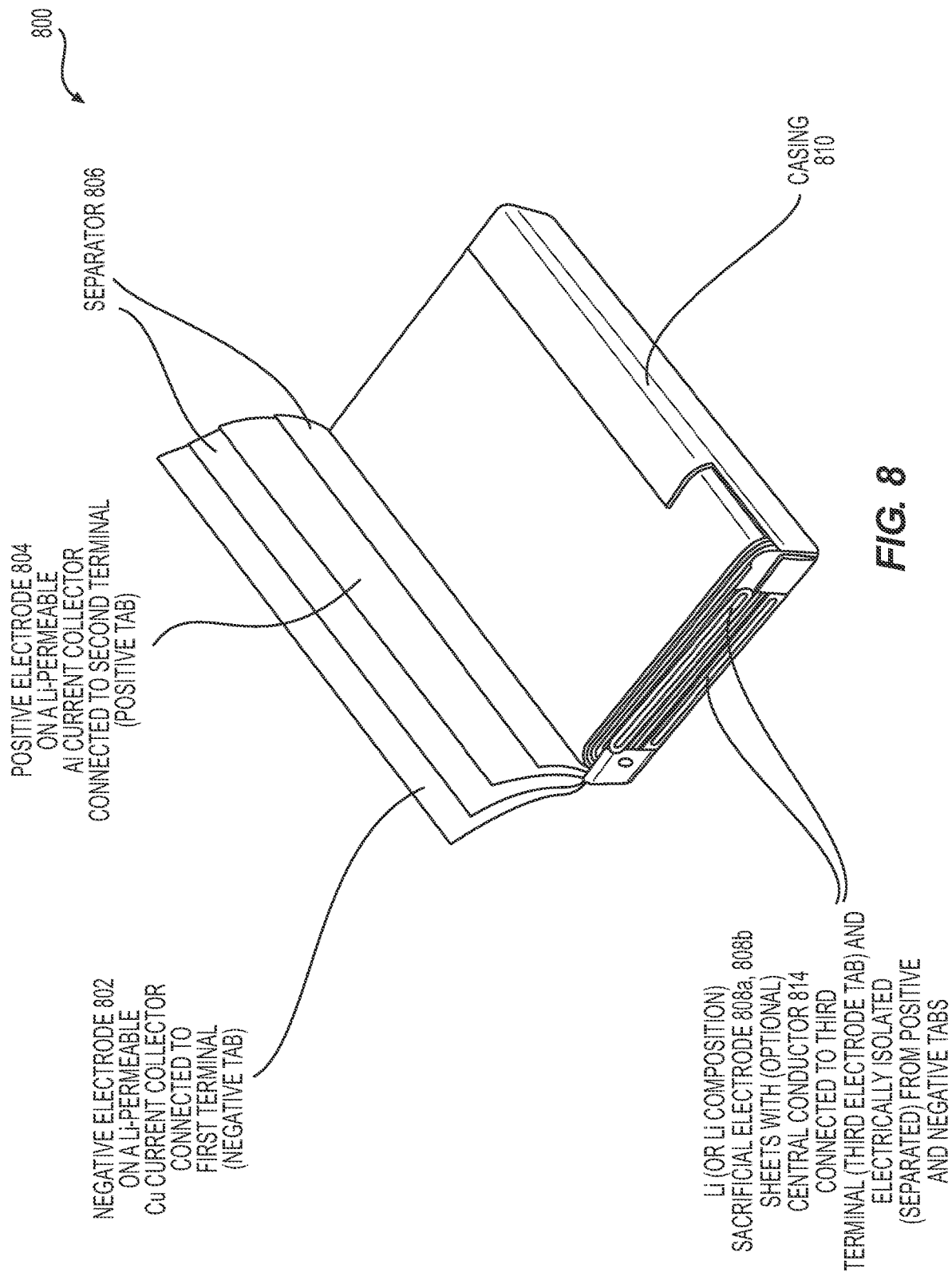
FIG. 8 illustrates another design of a prismatic cell.

FIG. 8 illustrates another embodiment in the form of a prismatic cell. In this example, the prismatic cell 800 includes electrodes permeable to Li ions (including a negative electrode 802 on a Li-permeable Cu current collector and a positive electrode 804 on a Li-permeable Al current collector), separator layers 806, and more than one sacrificial electrode 808a, 808b of high capacity Li composition, enclosed by a casing 810. By utilizing more than one sacrificial electrode "doping" can be conducted faster because the maximum diffusion distance will be smaller (since average diffusion time is approximately proportional to the square of the average diffusion distance, minimizing the average diffusion distance will dramatically reduce the doping time). The sacrificial electrode may also (optionally) include a central conductor 814)

Figure 9:
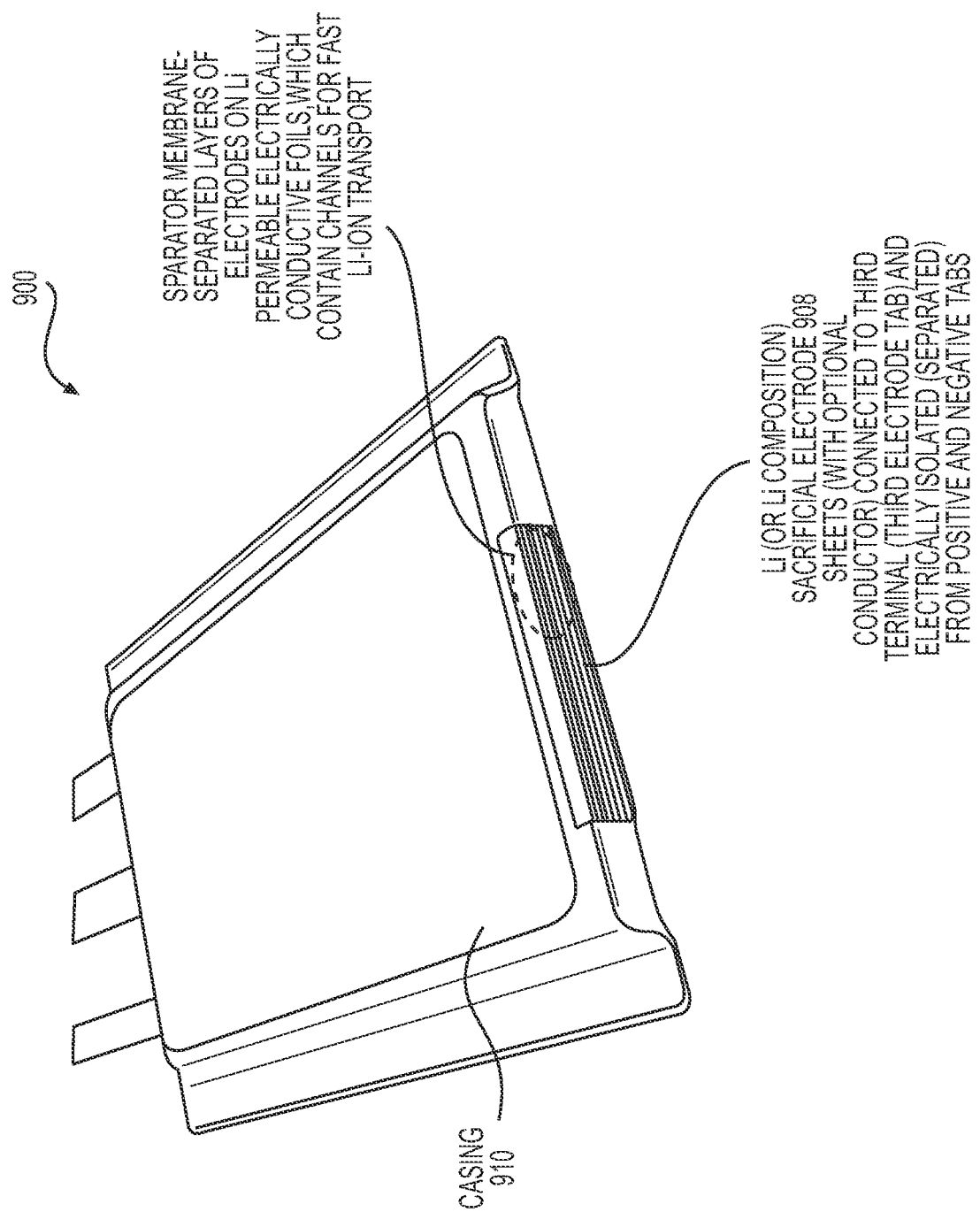
FIG. 9 illustrates a design of a pouch cell.

FIG. 9 illustrates another embodiment in the form of a pouch cell. In this example, the pouch cell 900 includes electrodes permeable to Li ions, separator layers and one sacrificial electrode 908 of high capacity Li composition either on one side of the cell or approximately in the center of the cell, enclosed by a casing 910. Pouch cells weigh less than prismatic cells and may offer higher energy density.

Figure 10:
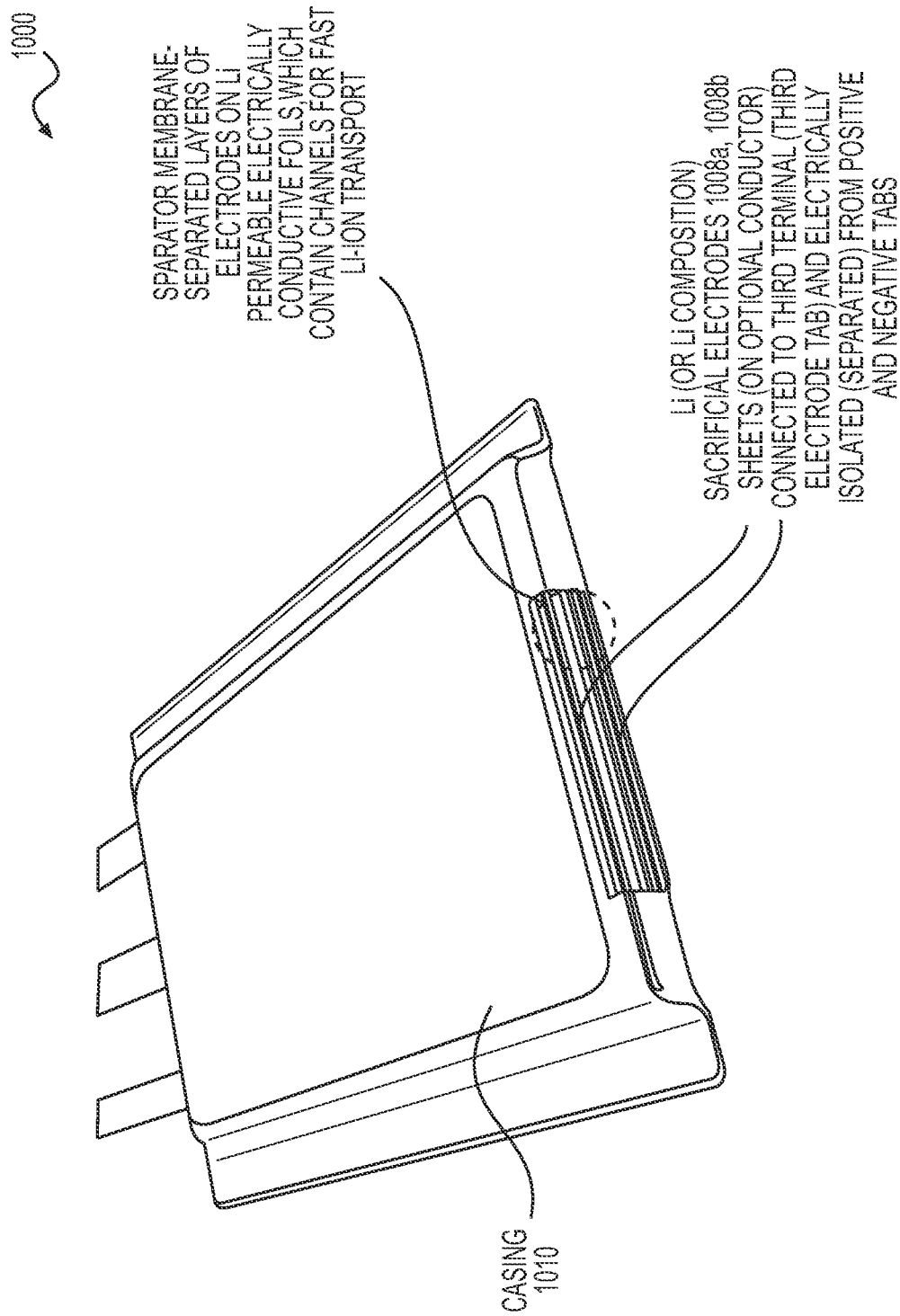
FIG. 10 illustrates another design of a pouch cell.

FIG. 10 illustrates another embodiment in the form of a pouch cell. In this example, the pouch cell 1000 includes electrodes permeable to Li ions, separator layers and more than one sacrificial electrode 1008a, 1008b of high capacity Li composition either on one side of the cell or approximately in the center of the cell, encased by a casing 1010.

The cylindrical, prismatic, and pouch cells with sacrificial electrode(s) may additionally comprise a fuse within the third terminal (tab) construction connected to the sacrificial electrode, as a safety feature.

The cylindrical, prismatic, and pouch cells with sacrificial electrode(s) may have a removable third terminal (tab) connected to this sacrificial electrode, as a safety feature. This tab can be removed after "Li insertion" or "Li doping" procedure but before, for example, shipping the battery from the factory to the customer.

The cylindrical, prismatic, and pouch cells with the sacrificial electrode(s) may additionally comprise one or more stable "reference" electrodes connected, for example, to a fourth terminal (fourth tab). Such electrode(s) should typically operate within a flat region of the charge-discharge curve and may be used to measure the potential of the positive or negative electrodes, or changes in such potential(s) with a high precision. Lithium titanate may serve as a suitable example of such an electrode material. By using this fourth electrode, one may electronically identify the "state of health" and various performance characteristics of either a positive or negative electrode, or both, and additionally detect if "Li doping" from the sacrificial third Li composition electrode is required.

Cylindrical, prismatic, and pouch cells with a third sacrificial electrode may be constructed using pre-assembled sacrificial electrode(s) connected to a pouch (in the case of a pouch cell) or cell case (in the case of a cylindrical or prismatic cell) prior to addition of the anode/separator/cathode stack into a cell and prior to filling the cell with electrolyte. The sacrificial electrode(s) of high capacity Li composition may be protected from the environment using a surface coating layer (e.g., a polymer or ceramic).

Cylindrical, prismatic, and pouch cells may contain sacrificial electrode(s) positioned perpendicular to the electrode stack (e.g., on the bottom of a cylindrical cell).

Conventional methods for the formation of porous metal foils for Li-ion batteries suffer from several limitations, as described in the background section above. Three of the key limitations include: (a) high cost, (b) poor mechanical properties, and (c) overly large pores, some of which may trap active materials. For active particles of 1-5 microns in diameter, for example, the presence of 5-50 micron pores in the porous metal foils may lead to various limitations. Similarly, for active particles of 5-20 microns in diameter, the pores should preferably be below 20 microns. The present disclosure provides architectures, compositions, and synthesis routes for the formation of Li-ion permeable metal current collectors with either smaller pores (in the range of about 5 nm to 5 microns, in some cases finely tunable within this pore size range and beyond to prevent incorporation of active particles during the step of foil coating with an electrode material) or with no through pores. The present disclosure also provides the general routes for enhancing mechanical properties of current collector foils (e.g., resistance to cracking, rupture, or other types of failure). The present disclosure also provides the general routes for enhancing adhesion between the electrode and the current collector foils.

It may be advantageous for the Li-ion permeable current collectors (such as Cu or Al) to remain relatively thin (preferably below about 20 microns in thickness) in order to minimize their mass and volume contributions within a cell. The present disclosure also provides the general routes for producing sufficiently thin current collectors.

If the Li-ion permeable current collectors comprise pores, it may be preferable for these pores to occupy a certain fraction of the volume (or cross-sectional area) of the current collectors. A fraction within 0.01% to 50% (preferably 1-20%) has been found to be generally suitable. A fraction smaller than 1% often does not provide sufficient ion transport (and thus requires long doping time), while a fraction larger than 50% generally does not provide the desired mechanical properties or sufficiently uniform distribution of electrical conductivity within the electrode.

Composite metal foils of the type provided herein (such as those comprising polymer(s), conductive carbon(s), and/or ceramic fillers) may provide at least one of the following advantages: (i) strengthening of the foil (because of the reinforcement by filler(s)), which additionally allows fabrication of thinner foils for Li-ion batteries (or, more generally, electrochemical energy storing devices), thus yielding higher volumetric capacity and energy density; (ii) in most cases (for example, when the density of filler is smaller than the density of metal), decreasing average foil density, thus yielding higher gravimetric capacities and specific energies of the corresponding Li-ion batteries (or, more generally, electrochemical energy storing devices); (iii) in some cases (for example, when a polymer filler of the polymer-comprising composite metal foil is similar in properties to the polymer binder used in the electrode construction, when the polymer filler of the polymer-comprising composite metal foil is capable of forming chemical bonds with the polymer binder of the electrode, or when the polymer filler of the polymer-comprising composite metal foil increases the surface roughness of the composite foil—that is, when, for example, polymer filler fibers (or polymer wires, nanowires, wiskers, and other elongated shaped particles) stick out of the foil, etc.) improving adhesion between the current collector and electrode active material; and (iv) high Li-ion permeability through the foils.

Figure 11A:
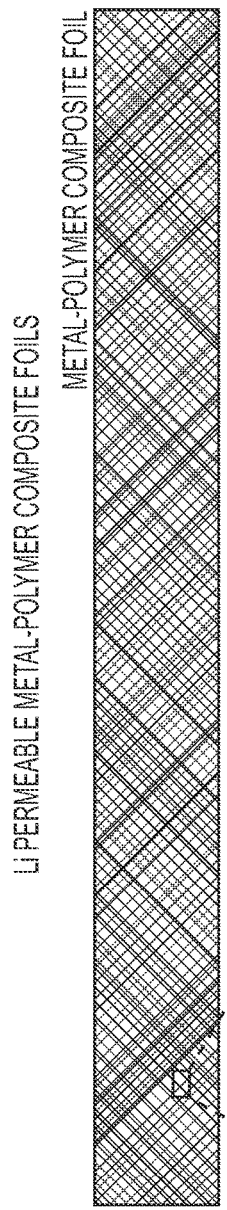
FIGS. 11A-11J illustrate several examples of electrically conductive composite Al-polymer, Cu-polymer foils that allow for fast Li-ion transport across the foils.

FIGS. 11A-11J illustrate several embodiments related to the formation of composite metal foils having polymer fillers. In an assembled cell, these interconnected polymer fillers allow for Li-ion transport through the cell. In particular, FIG. 11A illustrates a metal (e.g., Cu or Al) and polymer composite foil, and FIGS. 11B-11J illustrate the details of different polymer arrangement designs that may be implemented therein.

Figure 11B:
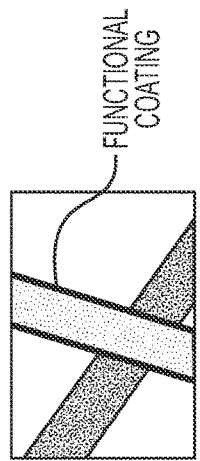
Figure 11C:
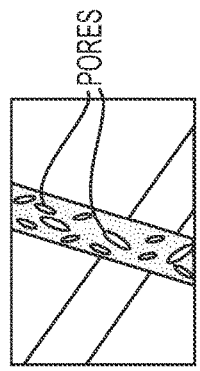

FIGS. 11B-11C illustrate a special case when polymer fibers (or polymer wires, nanowires, whiskers, and other elongated shaped particles) (dense, as in FIG. 11B, or porous, as in FIG. 11C) act as the polymer filler in the composite metal foils. In some cases, pores in the polymer fiber may be advantageous in terms of decreasing the foil weight and enhancing its mechanical stability.

In order to accomplish some of the above-described useful functions (such as reduced weight, volume, increased strength, high Li-ion permeability, etc.), the polymer structure should meet some physical and chemical requirements. For example, a polymer should have sufficient physical strength in order to re-enforce the metal-fiber (such as Cu-fiber) composite. In order to provide high Li-ion permeability through the foil, at least a portion of the polymer filler structure may be swellable in the electrolyte solvent. In order to improve electrode stability, a strong adhesion (i) between the metal (for example, Cu in the case of a Li-ion battery anode current collector) and the polymer filler and/or (ii) between the polymer filler and the binder, may be desired.

The high strength of the polymer and rigidity in the presence of an electrolyte solvent can be realized by the introduction of crystalline regions into the polymer structure. Inclusion of functional groups capable of hydrogen bonding (H-bonding) or strong dipole-dipole interactions into the polymer structure may be used to assist in the formation of crystalline regions in the polymer filler. Introduction of symmetric, low bulkiness units into the polymer structure may also be used to aid in the formation of crystalline domains in the polymer structure. Vinyl alcohol, acrylic (methacrylic) acid, and acrylamides groups are examples of H-bonding and highly polar groups. Ethylene repeating units, tactic (isotactic and syndiotactic) polypropylene are examples of crystalline domain forming non-polar groups.

For the polymer filler (such as polymer fibers of the metal composite foil) to provide fast Li-ion permeation though the composite foil, it may be advantageous for individual segments of such a filler (e.g., individual fibers) to form an interconnected network within the composite foil. In addition, the polymer filler (such as polymer fibers) present in the metal foil structure may be selected to provide high ionic conductivity to the ions present in the electrolyte. This high conductivity can be achieved by introducing repeating units, which can swell in the electrolyte solvent, into the polymer filler structure. The nature of "ion conducting groups" will be dependent on the solvent used in the battery electrolyte. For example, for organic solvent electrolytes (such as carbonates) used in commercial Li-ion batteries, "low" or "medium" polarity fragments may be used. These include, but are not limited to, ethylene glycol, butadiene, acrylonitrile, acrylate, and methacrylate repeating units. For water based electrolytes (which may be used in alternative battery chemistries), ethylene glycol, acrylamide, and vinyl alcohol repeating units can provide electrolyte swellability and ionic conductivity. Matching a solubility parameter of the "swellable" polymer fragments and electrolyte solvent can help to make the precise, quantitative choice of the swellable parts of the polymer structure. A solubility parameter is a numerical estimate of the degree of interaction between the polymer and electrolyte solvent materials, which can serve as a good way to predict mutual solubility of the materials. Hoy, Hansen, and other solubility parameter sets are examples.

Figure 12:
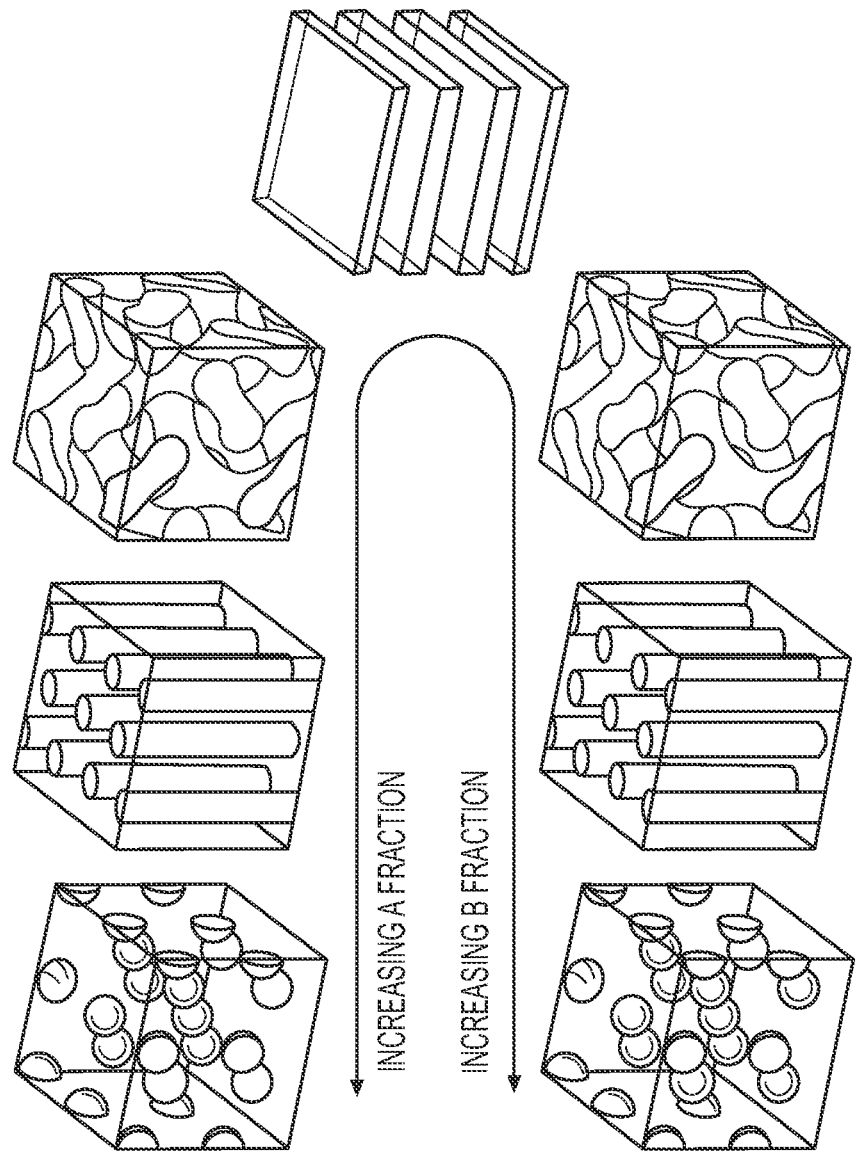
FIG. 12 illustrates several examples of possible morphologies of block co-polymers that may be used for polymer compositions of polymer-containing metal foils.

Control of the polymer filler micro domain structure may allow for further control and precise tuning of the polymer properties. Examples of such a micro domain structure control include using: (i) graft- and (ii) block co-polymers. FIG. 12 shows examples of a typical micro domain structure of block-copolymers, depending on the relative size of the A and B blocks constituting the polymer molecule. Various architectures of the polymer molecules (e.g., comb-like, ladder-like, star-like, etc.) can be utilized. The size of the individual domains within the polymer on the order of one nm to tens of nm can be altered by varying their molecular weight, while the type of morphology can be varied by changing the ratio between the A and B blocks. As an example, one block of the polymer (e.g., A) can provide one useful function (for example, high strength or strong adhesion to the metal of the current collector or to the electrode binder), while the second block (e.g., B) can serve to provide high ionic conductivity within the polymer. It will be appreciated that the number of different blocks of the polymer filler is not limited to two. Utilizing more than two blocks provides additional flexibility to combine various attractive properties into the polymer filler.

By combining functional building units into the polymer structure, the desired performance and functionality can be achieved. Co-monomers bearing desired functional groups can be polymerized by various known polymerization methods, including but not limited to: radical, anionic, cationic, metathesis, or various other kinds of polymerization. Both random, as well as complicated (block, star, comb, etc.) architectures of the polymer molecules can be obtained and utilized in the polymer fillers.

Figure 11D:
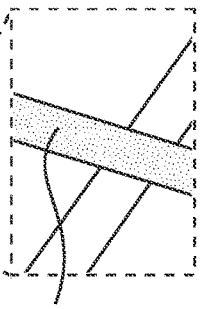

In some applications, it may be advantageous to induce a functional coating on at least a portion of the surface of at least some of the polymer filler(s), as shown in FIG. 11D. Examples of such coatings include, but are not limited to: another polymer, organic moieties, organic molecules, ceramic, carbon, etc. Such a coating may, for example, improve the polymer-metal interface. In some cases, such a coating may also make the polymer surface electrically conductive.

In some applications where fast Li-ion transport through the polymer filler is desired, it may be advantageous to select a polymer with ionic conductivity in excess of $10^{-6}$ S/cm when exposed to electrolyte solvent.

Figure 11E:
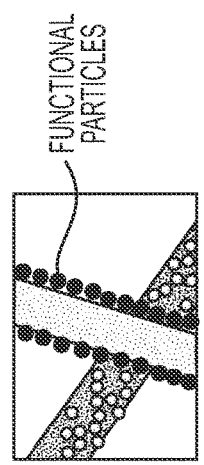

Formation of metal-polymer composite foils may also result in the formation of pores, either interconnected or closed, as shown in FIG. 11E. Such pores reduce the foil weight and may increase the ionic conductivity of Li-ions through the composite foils.

Figure 11F:
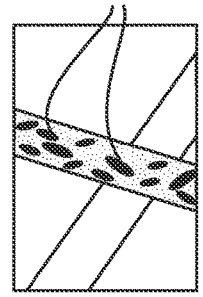

The polymer filler material (such as polymer fibers) may also contain smaller filler particles, as shown in FIG. 11F. Such particles may, for example, enhance the polymer filler strength, or, for example, increase its conductivity.

Figure 11G:
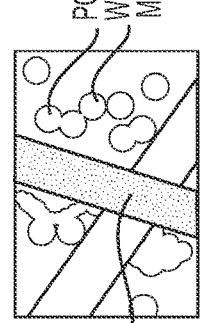

The surface of the polymer filler material may be coated with functional particles, as shown in FIG. 11G. Such particles may, for example, improve the polymer-metal interface or make the polymer surface electrically conductive.

Figure 11H:
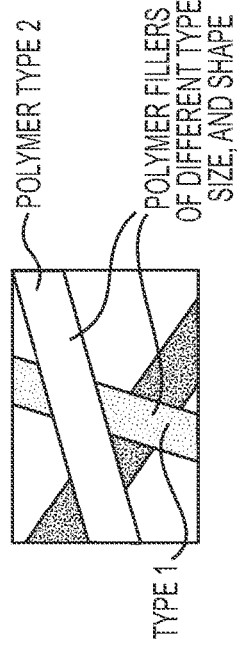
Figure 11I:
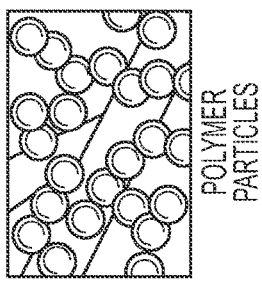
Figure 11J:
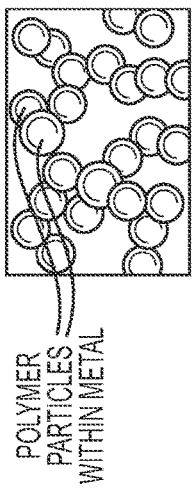

Instead of the polymer fibers (or in addition to the polymer fibers), other shapes of the polymer fillers may be utilized, such as near spherical, flake-shape, irregular shape, or others, as shown in FIG. 11H. Polymer filler materials of various shapes and various compositions may also be used in combination, as shown in FIGS. 11I-11J. One type of polymer filler may enhance mechanical properties of the composite foil, while another type may enhance ionic conductivity of the composite foil.

In other embodiments, ceramic fillers may be used in the composite metal foils. FIGS. 13A-13J provide a few illustrative examples of the composite architectures, where ceramic fillers of various shapes (such as ceramic fibers, nanofibers, wiskers, wires, nanowires, particles, flakes, and others) are used to enhance properties of the composite metal foil current collectors for Li-ion batteries and other energy storage devices. In many applications (e.g., when better mechanical properties are desired), it may be advantageous for the ceramic filler particles to exhibit an elongated shape.

Similar to the polymer filler designs of FIGS. 11A-11J, the ceramic fillers may be porous, contain a surface coating, contain fillers, contain particles of another material on the surface, etc. Various ceramic fillers may also be used in combination to provide various functions, so that one type of ceramic filler, for example, primarily enhances morphology or mechanical properties of the composite foil, while another type of the ceramic filler (e.g., made of a solid electrolyte material or a material that exhibits both ionic and electrical conductivities) primarily provides high Li-ion conductivity to the composite or induces pore formation within the composite foil.

In still other embodiments, conductive carbon fillers may be used in the composite metal foils. FIGS. 14A-14G provide a few illustrative examples of the composite architectures, where carbon fillers of various shape (such as carbon fibers, carbon nanotubes, graphene, graphite flakes, various carbon particles, etc.) may be used to enhance properties of the composite metal foil current collectors for Li-ion batteries and other energy storage devices. Similar to the polymer filler designs of FIGS. 11A-11J and the ceramic filler designs of FIGS. 13A-13J, the carbon fillers may be porous, contain a surface coating, contain particles of another material on the surface, etc. Various types of carbon fillers may also be used in combination to provide various functions. For example, one type of carbon filler material may primarily enhance morphology or mechanical properties of the composite foil, while another type of the carbon filler primarily provides high Li-ion conductivity.

Figure 15A:
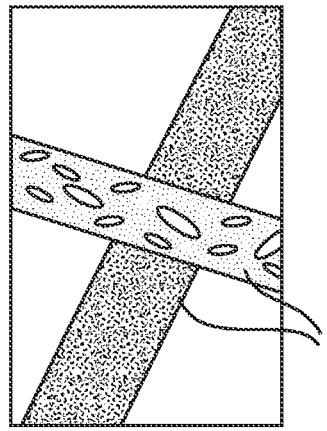
FIGS. 15A-15B illustrate examples of ion-permeable electrically conductive Al or Cu matrix composite foils with two or more different types of functional fillers.
Figure 15B:
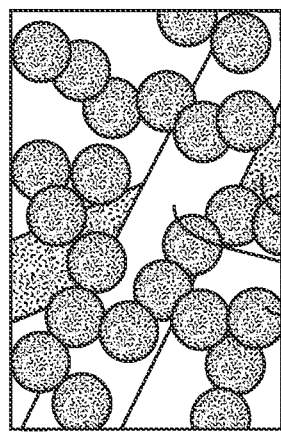

It will be appreciated that various carbon, ceramic and polymer fillers of various size, shape, and composition may be used in combination to achieve a unique combination of useful properties to the composite foils. Such properties may include, but are not limited to: high strength, low weight, high Li-ion permeability, low cost, etc. FIGS. 15A-15B provide two illustrative examples.

In addition to utilization of filler materials (including nanomaterials) for the fabrication of current collector foils for Li-ion batteries, useful architectures of suitable foils include those containing small (e.g., smaller than active material particle size) pores or small (e.g., smaller than the average size of active material particles or agglomerates of particles) through channels (which may exhibit low tortuosity and thus provide fast electrolyte transport through the foils). Such pores or channels may be used in combination with filler material(s) to enhance properties of current collectors. FIGS. 16A-16H provide illustrative examples of such architectures. FIG. 16A illustrates a composite foil that provides better ionic conductivity, better mechanical properties, and/or better other useful properties (lower weight, better adhesion, etc.) than a regular metal foil. FIG. 16B illustrates a composite foil that contains two or more filler materials. FIG. 16C illustrates a composite foil that contains pores. FIG. 16D illustrates a plain foil that contains small through channels for ionic conductivity through the foil. FIG. 16E illustrates a composite foil that contains small through channels. FIG. 16F illustrates a current collector foil that contains porous areas. In this case, the overall mechanical properties of the foil may remain good since dense areas provide good mechanical strength, while the porous areas provide high ionic conductivity. FIG. 16G illustrates a current collector foil that contains both porous areas (which enhance ionic conductivity, but may locally reduce mechanical properties) and filler-enhanced areas (which, for example, provide enhanced mechanical strength to the composite foil). FIG. 16H illustrates a composite current collector foil that contains porous areas (which enhance ionic conductivity).

FIGS. 17A-17F provide illustrations of the top views of some of the above-described foil compositions, which help to illustrate different aspects of certain embodiments. FIG. 17A shows two types of different fillers emerging from the surface of the composite foil current collector. FIG. 17B illustrates a Li-ion permeable porous foil current collector, where pores or through channels are grouped in certain areas of the foil, while other areas are pore- or channel-free. FIG. 17C illustrates a Li-ion permeable porous foil current collector, where pores or through channels are uniformly distributed within the foil. FIG. 17D illustrates a Li-ion permeable composite porous foil current collector, where pores and fillers are distributed uniformly. FIG. 17E illustrates a Li-ion permeable composite porous foil current collector, where pores are segregated (concentrated) in certain areas of the composite foil. FIG. 17F illustrates a Li-ion permeable composite porous foil current collector, where pores or through channels are significantly different in characteristic dimensions. In this particular illustration, regularly spaced through channels have a larger diameter than the diameter of the filler fibers of particles.

Several different routes and process flows may be utilized for the fabrication of the discussed above composite and/or Li-ion permeable metal current collectors. The filler material(s) and/or pores or pore channels may also be fabricated and dispersed within the foils by using a variety of suitable techniques.

Figure 18B:
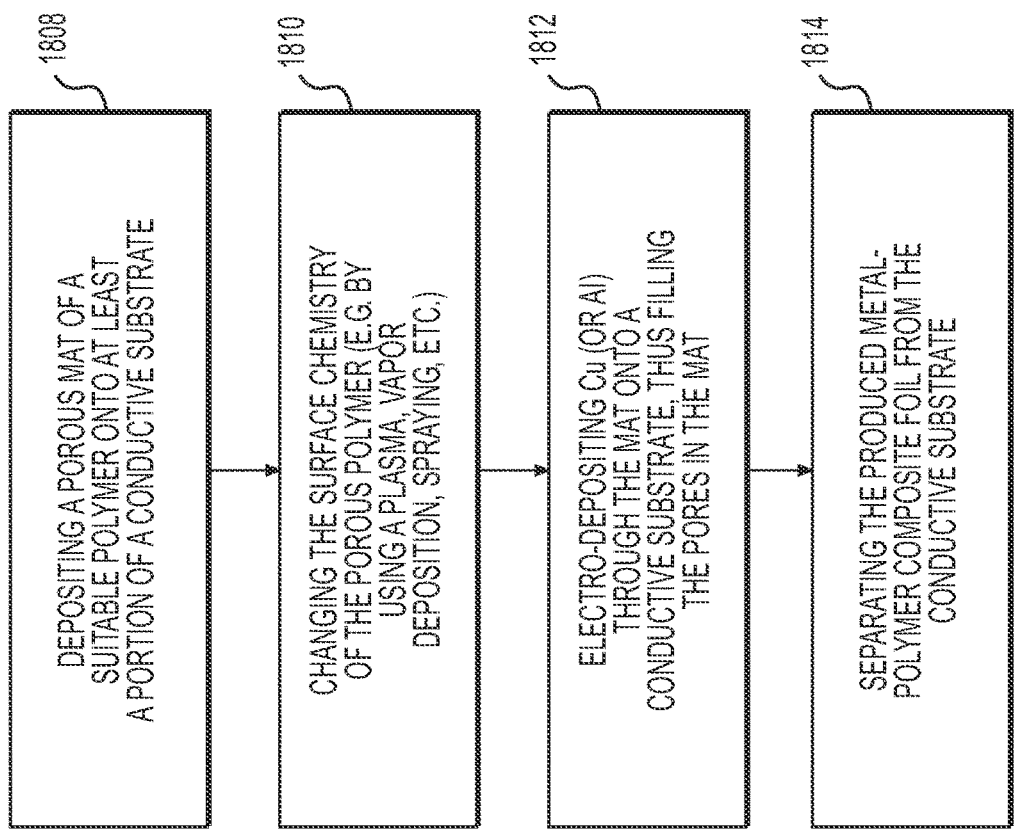
FIGS. 18A-18B illustrate exemplary flow charts explaining method(s) of manufacturing conductive composite metal-polymer foils that allow for fast Li-ion transport across the foils.
Figure 18A:
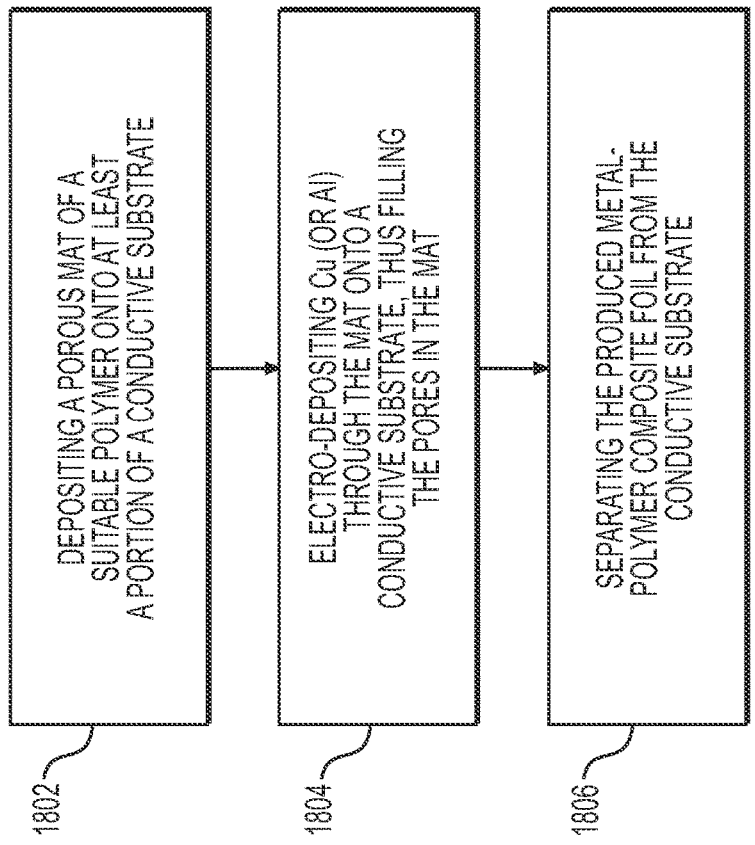

FIGS. 18A-18B illustrate two examples of process flows for the fabrication of polymer-metal current collector foils. Deposition of the polymer fillers on suitable substrates may be achieved by a variety of suitable techniques, including but not limited to: electro-deposition, spray coating, electro-spraying, electro-spinning, melt spinning, self-assembling, charge-assisted deposition (including electrophoretic deposition), and others. In the example of FIG. 18A, a porous mat of a suitable polymer may be deposited onto at least a portion of a conductive substrate (block 1802). Metal such as Cu (or Al) may be electro-deposited through the mat onto a conductive substrate (block 1804), thus filling the pores in the mat. The produced metal-polymer composite foil may then be separated from the conductive substrate (block 1806). In the example of FIG. 18B, a porous mat of a suitable polymer may be deposited onto at least a portion of a conductive substrate (block 1808). The surface chemistry of the porous polymer may be changed (block 1810) by using a plasma, vapor deposition, spraying, etc. A metal such as Cu (or Al) may then be electro-deposited through the mat onto a conductive substrate (block 1812), thus filling the pores in the mat. The produced metal-polymer composite foil may then be separated from the conductive substrate (block 1814).

Figure 19:
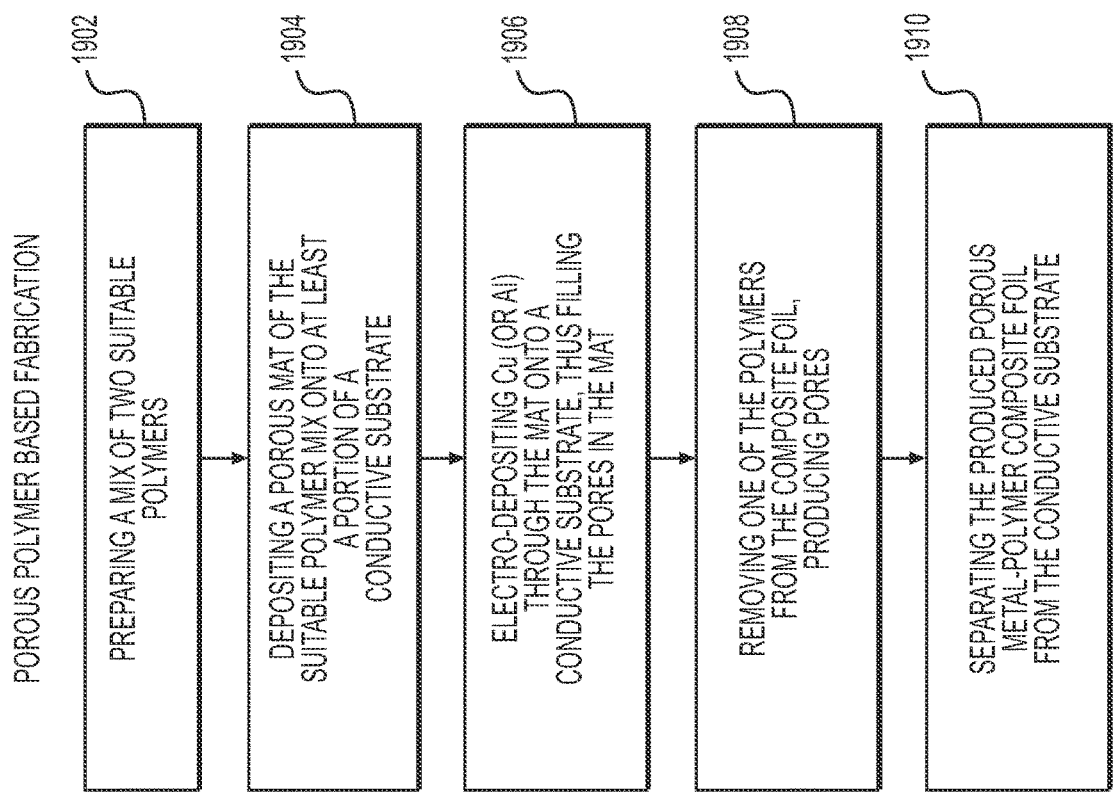
FIG. 19 illustrates an exemplary flow chart explaining method(s) of manufacturing conductive porous composite metal-polymer foils that allow for fast Li-ion transport across the foils.

FIG. 19 illustrates an example of a process flow for the fabrication of porous current collector foils, which may additionally contain polymer filler(s). In this example, a mix is prepared of two suitable polymers (block 1902). A porous mat of the suitable polymer mix may be deposited onto at least a portion of a conductive substrate (block 1904). A metal such as Cu (or Al) may be electro-deposited through the mat onto a conductive substrate (block 1906), thus filling the pores in the mat. One of the polymers may be removed (e.g., by dissolution, by selective etching, or by other means) from the composite foil (block 1908), producing pores. The produced porous metal-polymer composite foil may then be separated from the conductive substrate (block 1910).

Figure 20:
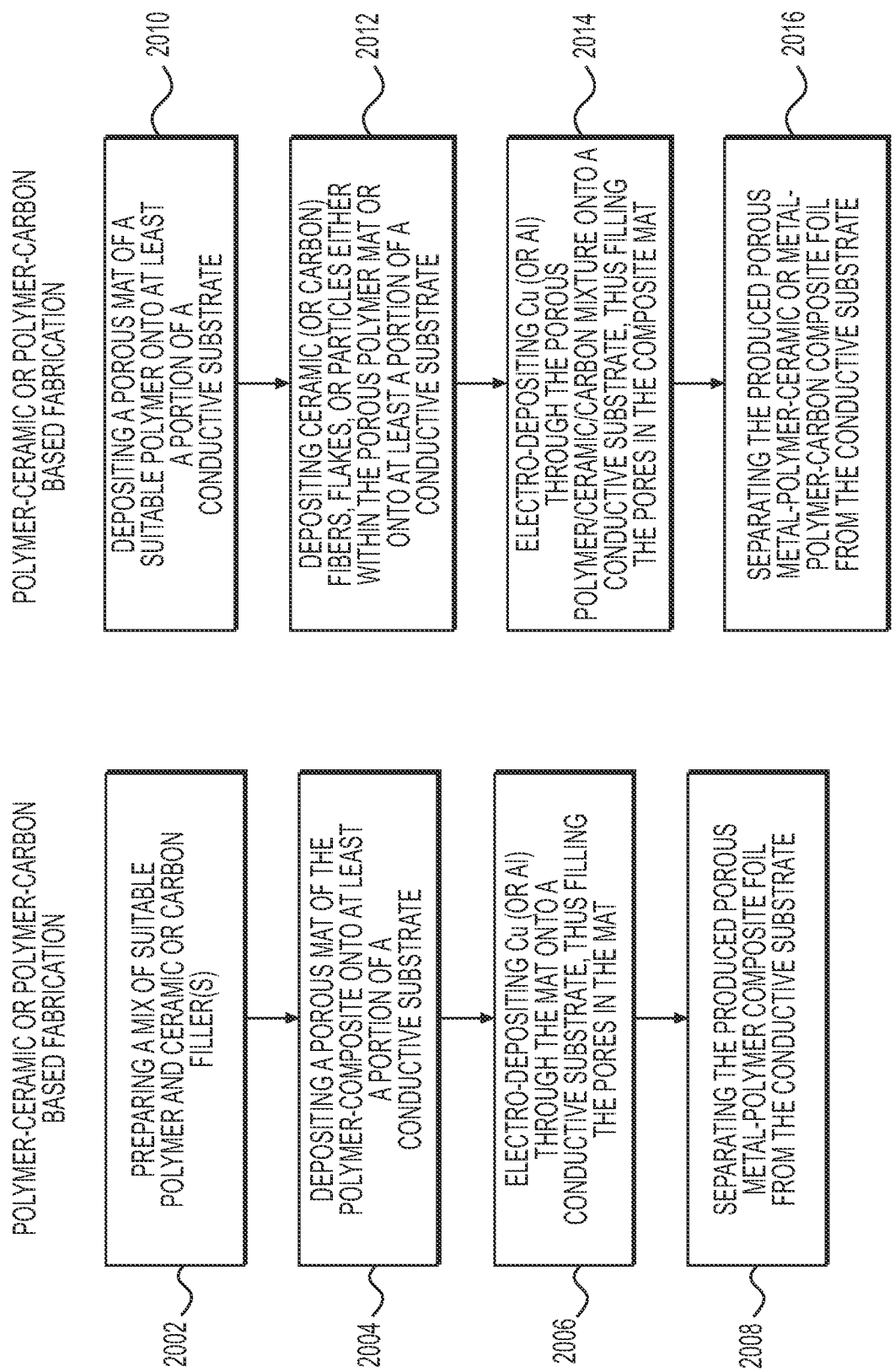
FIGS. 20A-20B illustrate exemplary flow charts explaining method(s) of manufacturing conductive composite metal-polymer-ceramic or composite metal-polymer-carbon foils that allow for fast Li-ion transport across the foils.

FIGS. 20A-20B illustrate two examples of process flows for the fabrication of composite polymer-ceramic-metal or composite polymer-carbon-metal current collector foils. In the example of FIG. 20A, a mix of a suitable polymer and a ceramic or carbon filler(s) may be prepared (block 2002). A porous mat of a polymer-composite may be deposited onto at least a portion of a conductive substrate (block 2004). A metal such as Cu (or Al) may be deposited through the mat onto a conductive substrate (block 2006), thus filling the pores in the mat. The produced porous metal-polymer composite foil may be separated from the conductive substrate (block 2008). In the example of FIG. 20B, a porous mat of a suitable polymer may be deposited onto at least a portion of a conductive substrate (block 2010). Ceramic (or carbon) fibers, flakes, or particles may be deposited either within the porous polymer mat or onto at least a portion of a conductive substrate (block 2012). A metal such as Cu (or Al) may be electro-deposited through the porous polymer/ceramic/carbon mixture onto a conductive substrate (block 2014), thus filling the pores in the composite mat. The produced porous metal-polymer-ceramic or metal-polymer-carbon composite foil may then be separated from the conductive substrate (block 2016).

Figure 21:
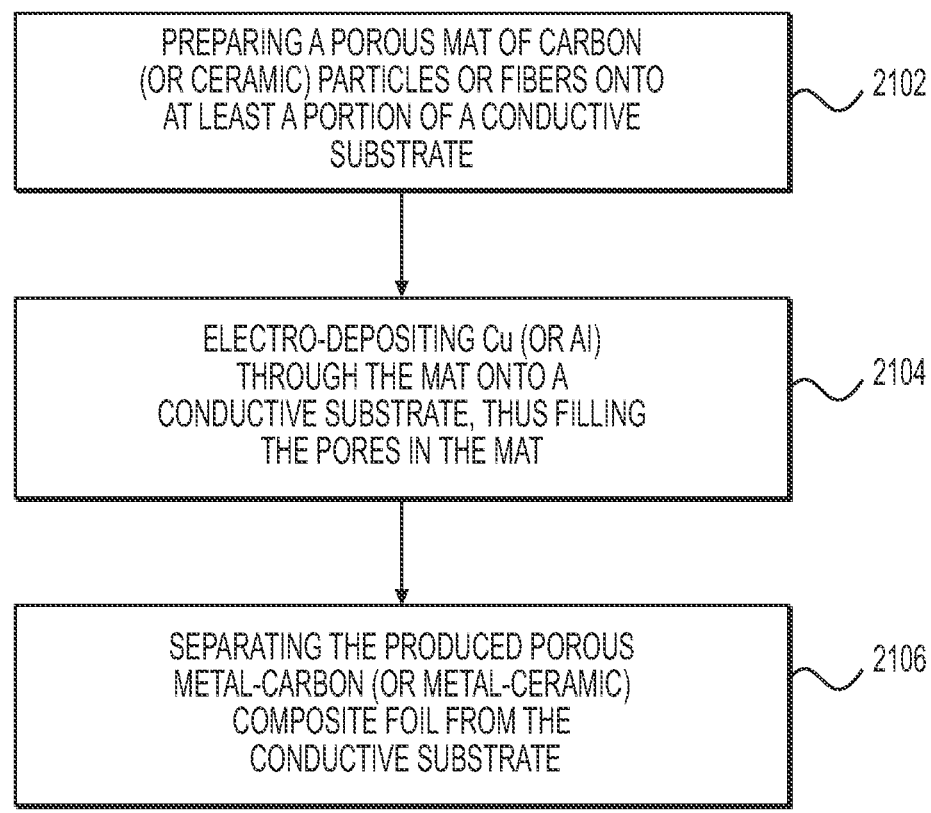
FIG. 21 illustrates an exemplary flow chart explaining method(s) of manufacturing conductive composite metal-ceramic or composite metal-carbon foils.

FIG. 21 illustrates an example of a process flow for the fabrication of composite carbon-metal or ceramic-metal current collector foils. In this example, a porous mat of carbon (or ceramic) particles or fibers may be prepared onto at least a portion of a conductive substrate (block 2102). A metal such as Cu (or Al) may be electro-deposited through the mat onto a conductive substrate (block 2104), thus filling the pores in the mat. The produced porous metal-carbon (or metal-ceramic) composite foil may then be separated from the conductive substrate (block 2106).

Figure 22:
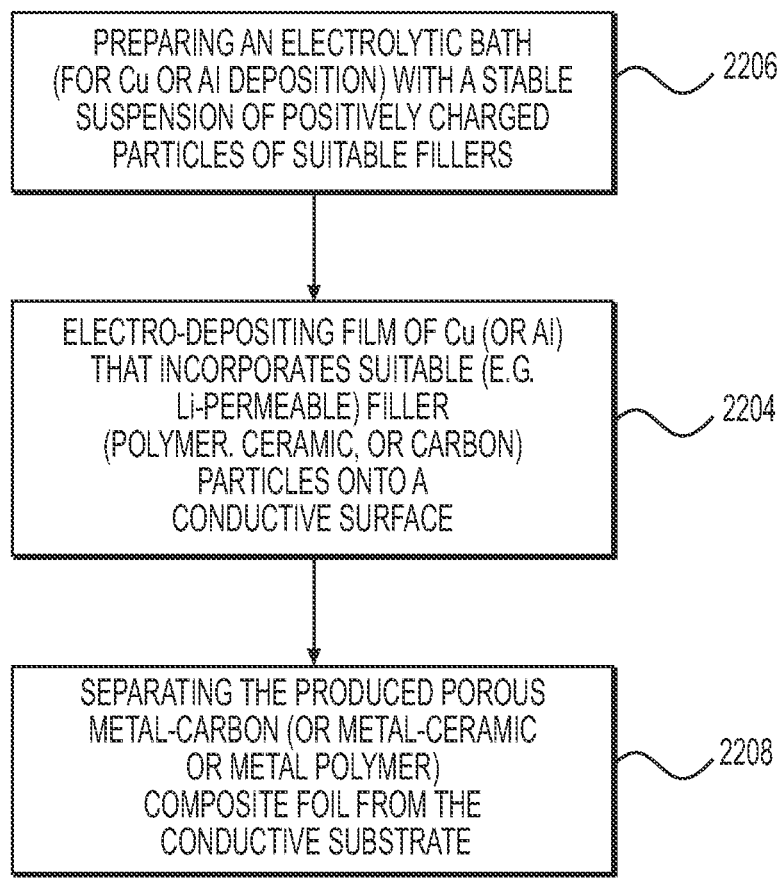
FIG. 22 illustrates an exemplary flow chart explaining method(s) of manufacturing conductive composite metal-ceramic or composite metal-carbon foils.

FIG. 22 illustrates an example of a process flow for the fabrication of metal-filler composite foils. In this example, an electrolytic bath is prepared (for Cu or Al deposition) with a stable suspension of positively charged particles of suitable fillers (block 2202). A film of Cu (or Al) that incorporate suitable (e.g., Li-permeable) filler (polymer, ceramic, or carbon) particles may be electro-deposited onto a conductive surface (block 2204). The produced porous metal-carbon (or metal-ceramic or metal-polymer) composite foil may then be separated from the conductive substrate (block 2206).

Figure 23:
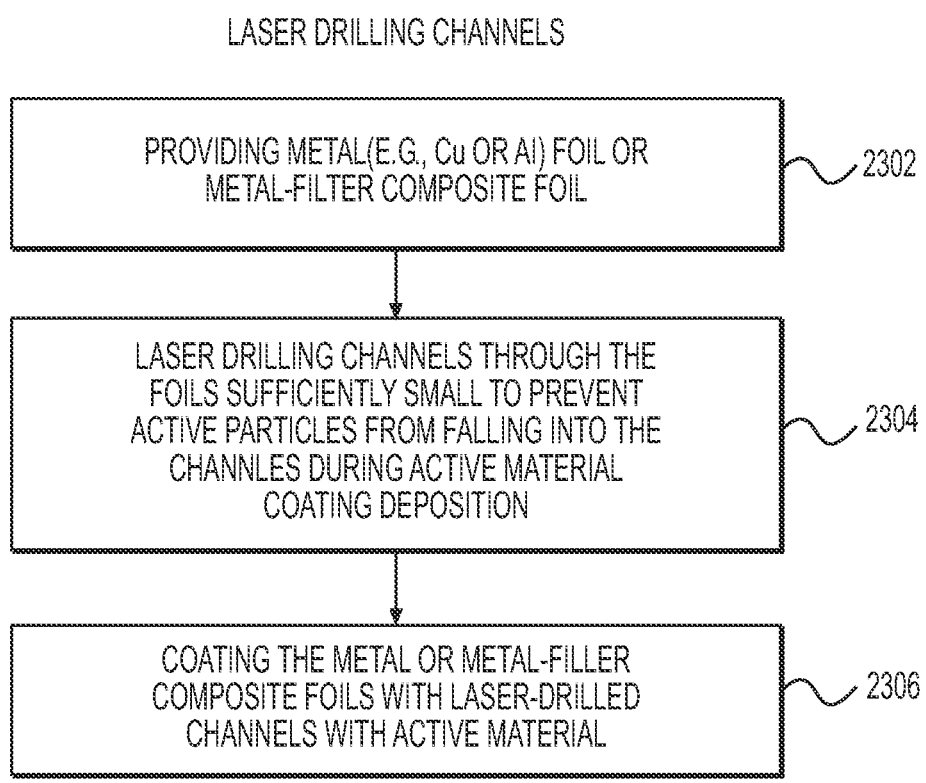
FIG. 23 illustrates an exemplary flow chart explaining method(s) of manufacturing conductive metal or metal-filler composite foils that contain a plurality of cylindrical or slit-shaped through-thickness channels and allow for fast Li-ion transport across the foils.

FIG. 23 illustrates an example of a process flow for the fabrication of Li-ion permeable electrodes using porous foil current collectors that contain through channels. In this example, a metal (e.g., Cu or Al) foil or metal-filler composite foil is provided (block 2302). Channels through the foils may be laser drilled sufficiently small to prevent active particles from falling into the channels during active material coating deposition (block 2304). The metal or metal-filler composite foils with laser-drilled channels may then be coated with active material (block 2306).

Figure 24:
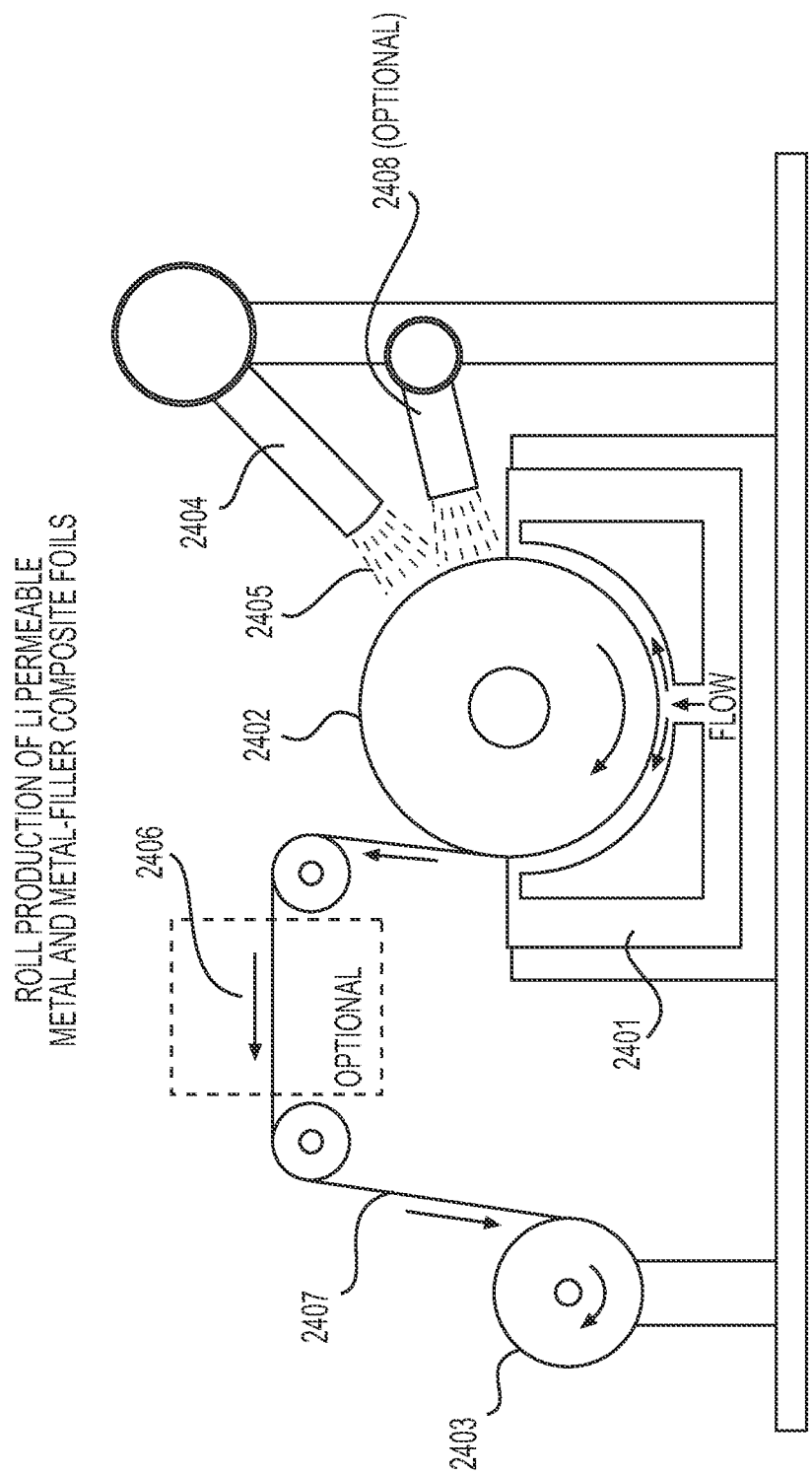
FIG. 24 is a diagram explaining an example roll manufacturing of a conductive Li-ion permeable metal or metal-filler composite foil.

FIG. 24 illustrates a schematic example for a continuous roll production of Li-permeable metal and metal-filler composite foils. In this example, the production process includes an electrolytic bath 2401 for metal or metal-filler composite deposition; a conductive roll 2402; a collected roll 2403 of metal or metal-filler composite foil; a device 2404 for the filler deposition (e.g., electro-spray, ultrasonic spray, melt-sprayer, etc.); a filler material 2405 to be deposited; an optional system 2406 for continuous pore formation (e.g., drilling—including laser drilling—or punching device, or etching a polymer from polymer-metal composite foil, etc.); a Li ion permeable foil 2407; and an optional dryer or solvent extractor 2408.

Utilization of high capacity anodes (e.g., anodes with a gravimetric capacity above 400 mAh/g, preferably above 500 mAh/g, or with a high volumetric capacity, such as a capacity above 500 mAh/cc, preferably above 650 mAh/cc) in combination with Li-ion permeable current collectors and sacrificial electrodes in the cell construction may be particularly advantageous because such electrodes allow construction of high energy density cells, but typically exhibit high irreversible Li losses during so-called "formation" and electrolyte reduction on the anode surface, where some of the Li is irreversibly trapped within the solid-electrolyte interphase (SEI). Because high capacity particle-based anodes typically exhibit significant volume changes during battery operation, it may be beneficial for such changes to not induce mechanical failure of the current collectors. Therefore, it may be particularly beneficial that (i) current collectors possess good mechanical properties (e.g., achieved by using some of the current collector foil manufacturing techniques described herein) and (ii) only a very small amount (if any) of such high capacity particles be incorporated within the pores of the current collectors (e.g., if porous Cu current collector foil is used for the anode). Therefore, it may be advantageous for the current collector pores (if present) to be smaller than the average size of anode particles. Otherwise, expansion of those high capacity particles that experience volume changes during battery operation and that become trapped inside the current collector pores, may lead to the rapture of the foils and rapid battery failure.

In some cases when larger pores in the metal foils (e.g., pores larger than the average size of active material particles or agglomerates of active material particles) are economically more favorable to form, they may be partially filled with particles that exhibit very small volume changes during battery operation and Li-ions passing through the pores during the "doping" process. It may be advantageous for these filler materials to be also electrically conductive. Conductive carbon particles are an example of suitable filler material particles. In some designs, it may be advantageous for the filler material to additionally contain a polymer binder so that the particles do not leave the pores during electrode fabrication.

Various high capacity anode materials may be used. However, it is often advantageous for such materials to be a composite of low-capacity (e.g. less than 250 mAh/g) or regular capacity (e.g. between 250-372 mAh/g) active material with a high-capacity (from around 400 mAh/g to around 4200 mAh/g) active material.

Several types of high capacity anode active materials may be utilized in such composite anodes and used, for example, in the Li-ion battery constructions described above. Examples of such materials include: (i) group IV elements, including but not limited to Si and Sn; (ii) heavily (and "ultra-heavily") doped silicon; (iii) binary silicon alloys (or mixtures) with metals; (iv) ternary silicon alloys (or mixtures) with metals; and (v) other metals and metal alloys that form alloys with lithium.

Heavily and ultra-heavily doped silicon include silicon doped with a high content of Group II elements, such as B, Al, Ga, In, or Tl, or a high content of Group V elements, such as N, P, As, Sb, or Bi. By "heavily doped" and "ultra-heavily doped," it will be understood that the content of doping atoms is typically in the range of 3,000 parts per million (ppm) to 700,000 ppm, or approximately 0.3% to 70% of the total composition.

Group IV elements used to form higher capacity anode materials may include Ge, Sn, Pb, and their alloys, mixtures, or composites, with the general formula of $Si_a$—$Ge_b$—$Sn_c$—$Pb_d$—$C_e$-$D_f$, where a, b, c, d, e, and f may be zero or non-zero, and where D is a dopant selected from Group III or Group V of the periodic table.

For binary silicon alloys (or mixtures) with metals, the silicon content may be in the range of approximately 20% to 99.7%. Examples of such as alloys (or mixtures) include, but are not limited to: Mg—Si, Ca—Si, Sc—Si, Ti—Si, V—Si, Cr—Si, Mn—Si, Fe—Si, Co—Si, Ni—Si, Cu—Si, Zn—Si, Sr—Si, Y—Si, Zr, —Si, Nb—Si, Mo—Si, Tc—Si, Ru—Si, Rh—Si, Pd—Si, Ag—Si, Cd—Si, Ba—Si, Hf—Si, Ta—Si, and W—Si. Such binary alloys may be doped (or heavily doped) with Group III and Group V elements. Alternatively, other Group IV elements may be used instead of silicon to form similar alloys or mixtures with metals. A combination of various Group IV elements may also used to form such alloys or mixtures with metals.

For ternary silicon alloys (or mixtures) with metals, the silicon content may also be in the range of approximately 20% to 99.7%. Such ternary alloys may be doped (or heavily doped) with Group III and Group V elements. Other Group IV elements may also be used instead of silicon to form such alloys or mixtures with metals. Alternatively, other Group IV elements may be used instead of silicon to form similar alloys or mixtures with metals. A combination of various Group IV elements may also be used to form such alloys or mixtures with metals.

Examples of other metals and metal alloys that form alloys with lithium or exhibit high Li capacity include, but are not limited to, Mg, Al, Ga, In, Zn, Cd, P, and many others, as well as various combinations formed from these metals, their oxides, etc.

Figures 25A, 25B:
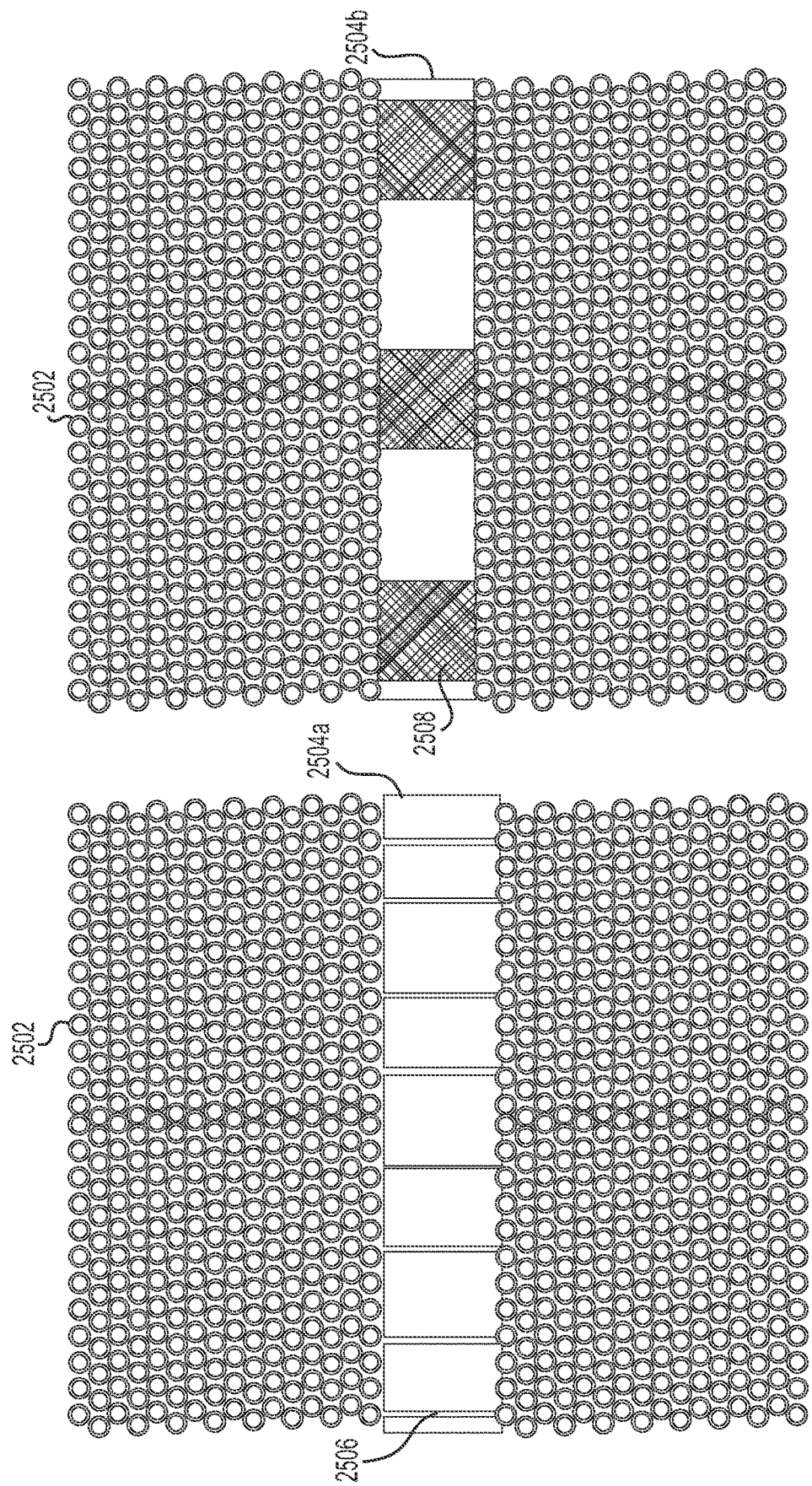
FIGS. 25A-25B illustrate exemplary Si-comprising anodes produced using Li-ion permeable Cu foils.

FIGS. 25A-25B illustrate two examples of Si-comprising anodes having current collector foils with high permeability for Li ions. In the each example, the anode includes Si-based active material particles 2502 (with a binder and optional conductive additives) and respective Li-ion permeable metal (e.g., Cu) foils 2504a, 2504b with small pores or through channels. In the example of FIG. 25A, the Li-ion permeable metal foil 2504a includes through channels 2506. In the example of FIG. 25B, the Li-ion permeable metal foil 2504b includes small pores 2508.

Figures 26A, 26B, 26C, 26D, 26E, 26F, 26G, 26H, 26I, 26J, 26K, 26L, 26M, 26N, 26O, 26P, 26Q, 26R:
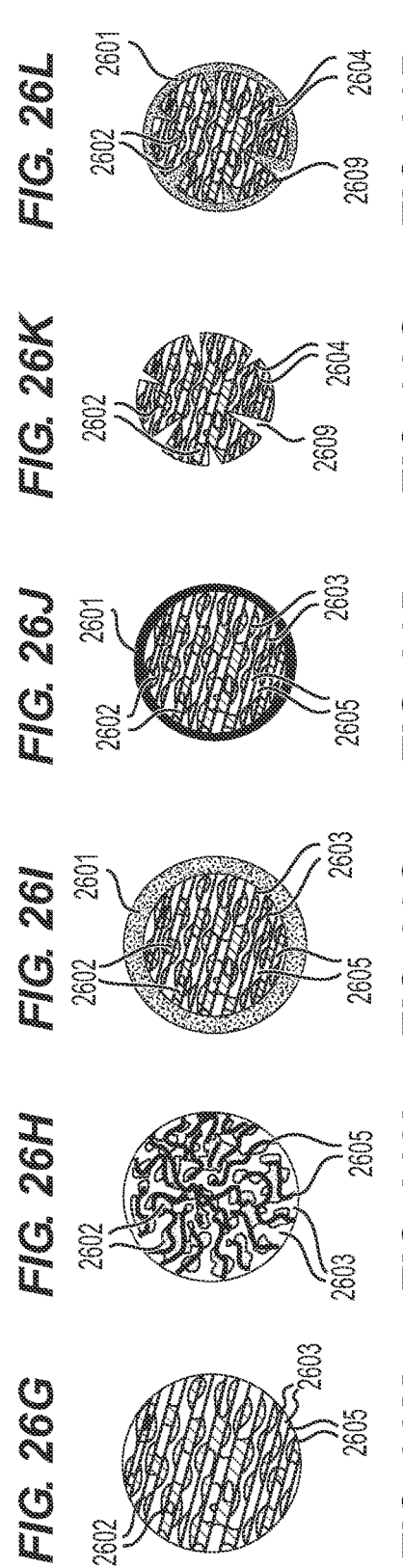
FIGS. 26A-26R illustrate several schematic examples of high-capacity powder-based Si-containing anodes (for use in rechargeable Li-ion batteries).

FIGS. 26A-26R illustrate different examples of suitable, high capacity composite anode particles, according to various embodiments, that comprise Si or other high-capacity active anode material. As shown, the different designs variously include a shell 2601, active material (e.g., Si) 2602, pores 2603, interconnected pores 2604, a porous scaffolding 2605 of electrically conductive material (with nanoparticles of active material 2602 incorporated therein), a backbone 2606 composed of connected nanoparticles of electrically conducting material (and coated with active material 2602), a porous particle 2607 composed of interconnected curved layers of electrically conductive material coated with active material 2602, a composite shell 2608, and larger "channel" pores 2609 within particles for faster electrolyte access.

More specifically, FIG. 26A illustrates an example design including a porous high capacity material (e.g., Si) coated with a Li-ion permeable shell of another material. FIG. 26B illustrates an example design including a high capacity material coated with a porous Li-ion permeable shell of another material. FIG. 26C illustrates an example design including a composite particle composed of smaller nanoparticles, nanoplatelets, or nanocoatings of a high capacity anode material (e.g., Si) deposited on the internal surface of a porous electrically conductive scaffold (e.g., a carbon scaffold) particles. FIG. 26D illustrates an example design including a composite particle composed of smaller nanoparticles, nanoplatelets, or nanocoatings of a high capacity material deposited on the internal surface of a porous electrically conductive scaffold particle and enclosed in an external Li-ion permeable shell. FIG. 26E illustrates an example design including a composite particle composed of smaller nanoparticles, nanoplatelets, or nanocoatings of a high capacity material deposited on the internal surface of a porous electrically conductive scaffold particle and enclosed in an external porous Li-ion permeable shell coating the produced composite. FIG. 26F illustrates an example design including a composite particle composed of smaller nanoparticles, nanoplatelets, or nanocoatings of high capacity material deposited on the internal surface of a hierarchical or dendritic structure of an electrically conductive material. FIG. 26G illustrates an example design including a composite core-shell particle composed of a core (which, in turn, is composed of smaller nanoparticles, nanoplatelets, or nanocoatings of a high capacity material deposited on the internal surface of a hierarchical or dendritic structure of an electrically conductive material) and a Li-ion permeable shell. FIG. 26H illustrates an example design including a composite core-shell particle composed of a core (which, in turn, is composed of smaller nanoparticles, nanoplatelets, or nanocoatings of a high capacity material deposited on the internal surface of a hierarchical or dendritic structure of an electrically conductive material) and a porous Li-ion permeable shell (that may additionally store Li ions during cell operation). FIG. 26I illustrates an example design including a composite particle composed of smaller nanoparticles, nanoplatelets, or nanocoatings of a high capacity material deposited on the internal surface of a curved two-dimensional (2D) electrically conductive material assembled into a three-dimensional (3D) porous particle that essentially electrically connects all of its 2D segments. FIG. 26J illustrates an example design including a composite core-shell particle composed of a core of the composition of the design of FIG. 26I and a Li-ion permeable shell (which may also be porous). Here, the sharp interface is shown between the core and the shell for illustration purpose only. A gradual change in the particle composition from the core towards the surface (with a higher content of active material in the center of the core and reducing towards the surface) is also contemplated. FIG. 26K illustrates an example design including a composite core-shell particle composed of a porous electrically conductive material (such as porous carbon) with the majority of pores in the range of about 0.4 to 40 nm infiltrated with a high capacity active material and enclosed within a Li-ion permeable composite shell. FIG. 26L illustrates an example design including a composite core-shell particle similar to the design of FIG. 26K but with a composite shell either composed of several layers or having a gradual structure or composition. FIGS. 26M-26N illustrate example designs including composite core-shell particles with various shapes and curvatures of the pore walls, similar to the design of FIG. 26K but without an external shell. FIGS. 26O-26P illustrate example designs including a composite core-shell particle similar to the design of FIG. 26K, but with a shell composed predominately of one material (with or without pores). FIGS. 26Q-26R illustrate example designs including composite particles similar to the designs of FIGS. 26K-26P but with additional "channel" pores that provide faster access of Li ions from the surface to the core of the particles.

It will be appreciated that the illustrations provided in FIG. 26 are not meant to be comprehensive or limiting of the scope of the invention. They are only provided to illustrate the diversity of various suitable anode particle compositions.

Utilization of high capacity cathodes (e.g., cathodes with a gravimetric capacity above 200 mAh/g or above 600 mAh/cc) in combination with Li-ion permeable current collectors and sacrificial electrodes in the cell construction may also be advantageous because such electrodes allow construction of high energy density cells. Many such high capacity cathode materials may be easier produced in a form that does not contain any Li. Therefore, the use of a sacrificial electrode and the Li-ion permeable construction of the current collectors to rapidly provide the needed Li may be particularly attractive.

One example of a class of such high capacity cathode materials is so-called "conversion"-type cathodes. Various metal fluorides ($MF_x$) (e.g., $FeF_2$, $FeF_3$, $CoF_2$, $CoF_3$, $CuF_2$, $BiF_5$, $BiF_3$, $NiF_2$, LiF, etc., their alloys, mixtures, etc.) are an example of such a class. For example, in the case of a Li-ion battery, a metal fluoride is transformed into a mixture of a metal and LiF during discharge and back to the initial metal fluoride during charge. More generally, the formation of new fluoride(s) composed of the metal ions takes place during insertion of the metal ions into the active material. The releasing of the metal ions is accompanied by the re-formation of the original fluoride material. The release and storage of the metal ions within an active fluoride material is accompanied by a substantial change in volume of the active material.

In some applications, it may be advantageous to produce metal fluoride conversion-type cathodes either completely without LiF or without a maximum possible content of LiF. In some applications, it may also be advantageous to reduce the electrolyte on the surface of the metal fluoride material (e.g., as an SEI layer)—e.g., in order to prevent dissolution of metal fluorides during cycling. Such an SEI formation may consume a significant amount of Li from the cell. It may therefore be advantageous to provide Li to the cell from a third, sacrificial electrode.

It is often advantageous for metal fluoride-based cathode materials to be a composite of low-capacity (e.g. less than 50 mAh/g) or regular capacity (e.g., between 50-180 mAh/g) cathode active material with a high-capacity (from around 200 mAh/g to around 800 mAh/g) active material. In some applications, it may be further advantageous to embed metal fluoride nanoparticles or metal-LiF nanocomposite nanoparticles (such as M/LiF, M1-M2/LiF, or M1-M2-M3/LiF nanocomposite, where M, M1, M2, M3 are suitable metals, such as Fe, Cu, Bi, Co, Ni, and others, and their alloys and mixtures) into the shells or particles of either carbon or low-capacity (e.g., less than 50 mAh/g) or regular capacity (e.g., between 50-180 mAh/g) cathode active material. In this case, cell stability may be enhanced because metals or metal fluorides may be protected against unfavorable reactions with electrolyte during cell operation.

Figures 27A, 27B, 27C, 27D, 27E, 27F, 27G, 27H, 27I, 27J, 27K, 27L, 27M, 27N, 27O, 27P, 27Q, 27R:
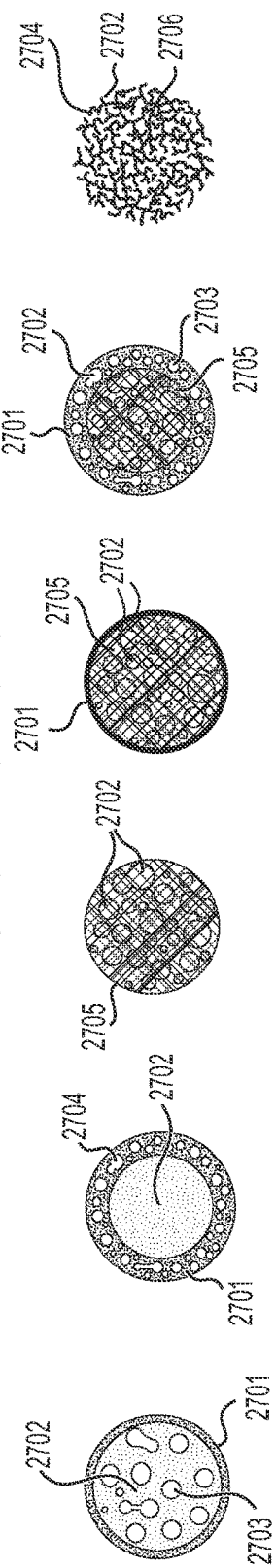
FIGS. 27A-27R illustrate several examples of high-capacity powder-based metal fluoride ($MF_x$)-containing conversion-type cathodes (for use in rechargeable Li-ion batteries).

FIGS. 27A-27R illustrate different examples of suitable, high capacity composite cathode particles, according to various embodiments, that comprise metal fluoride(s) ($MF_x$) or other high-capacity active cathode materials. Overall, the composite particle construction may, in some designs, be similar to that of the previously described examples of anode materials (FIGS. 26A-26R), with metal fluorides being used instead of Si. As shown, the different designs variously include a shell 2701, active material (e.g., metal fluoride(s)) 2702, pores 2703, interconnected pores 2704, a porous scaffolding 2705 of electrically conductive material (with nanoparticles of active material 2702 incorporated therein), a backbone 2706 composed of connected nanoparticles of electrically conducting material (and coated with active material 2702), a porous particle 2707 composed of interconnected curved layers of electrically conductive material coated with active material 2702, a composite shell 2708, and larger "channel" pores 2709 within particles for faster electrolyte access.

More specifically, FIG. 27A illustrates an example design including a porous high capacity material (e.g., metal fluoride(s)) coated with a Li-ion permeable shell of another material. FIG. 27B illustrates an example design including a high capacity material coated with a porous Li-ion permeable shell of another material. FIG. 27C illustrates an example design including a composite particle composed of smaller nanoparticles, nanoplatelets, or nanocoatings of a high capacity cathode material (e.g., metal fluoride(s)) deposited on the internal surface of porous electrically conductive scaffold (e.g., a carbon scaffold) particle. FIG. 27D illustrates an example design including a composite particle composed of smaller nanoparticles, nanoplatelets, or nanocoatings of a high capacity material deposited on the internal surface of a porous electrically conductive scaffold particle and enclosed in an external Li-ion permeable shell. FIG. 27E illustrates an example design including a composite particle composed of smaller nanoparticles, nanoplatelets, or nanocoatings of a high capacity material deposited on the internal surface of a porous electrically conductive scaffold particle and enclosed in an external porous Li-ion permeable shell coating the produced composite. FIG. 27F illustrates an example design including a composite particle composed of smaller nanoparticles, nanoplatelets, or nanocoatings of high capacity material deposited on the internal surface of a hierarchical or dendritic structure of an electrically conductive material. FIG. 27G illustrates an example design including a composite core-shell particle composed of a core (which, in turn, is composed of smaller nanoparticles, nanoplatelets, or nanocoatings of a high capacity material deposited on the internal surface of a hierarchical or dendritic structure of an electrically conductive material) and a Li-ion permeable shell. FIG. 27H illustrates an example design including a composite core-shell particle composed of a core (which, in turn, is composed of smaller nanoparticles, nanoplatelets, or nanocoatings of a high capacity material deposited on the internal surface of a hierarchical or dendritic structure of an electrically conductive material) and a porous Li-ion permeable shell (that may additionally store Li ions during cell operation). FIG. 27I illustrates an example design including a composite particle composed of smaller nanoparticles, nanoplatelets, or nanocoatings of a high capacity material deposited on the internal surface of a curved two-dimensional (2D) electrically conductive material assembled into a three-dimensional (3D) porous particle that essentially electrically connects all of its 2D segments. FIG. 27J illustrates an example design including a composite core-shell particle composed of a core of the composition of the design of FIG. 27I and a Li-ion permeable shell (which may also be porous). FIG. 27K illustrates an example design including a composite core-shell particle composed of a porous electrically conductive material (such as porous carbon) with the majority of pores in the range of about 0.4 to 40 nm infiltrated with a high capacity active material and enclosed within a Li-ion permeable composite shell. FIG. 27L illustrates an example design including a composite core-shell particle similar to the design of FIG. 27K but with a composite shell either composed of several layers or having a gradual structure or composition. The shell may comprise low-capacity (e.g. less than 50 mAh/g) or regular capacity (e.g., between 50-180 mAh/g) cathode active material. The shell may also comprise multiple core particles. In this case, this structure may be envisioned as metal-fluoride or metal-fluoride-comprising composites being embedded into the larger particles of carbon, low-capacity, or regular capacity cathode active material. FIGS. 27M-26N illustrate example designs including composite core-shell particles with various shapes and curvatures of the pore walls, similar to the design of FIG. 27K but without an external shell. FIGS. 27O-26P illustrate example designs including a composite core-shell particle similar to the design of FIG. 27K, but with a shell composed predominately of one material (with or without pores). FIGS. 27Q-26R illustrate example designs including composite particles similar to the designs of FIGS. 27K-26P but with additional "channel" pores that provide faster access of Li ions from the surface to the core of the particles. It will be understood that pores 2703 are not required if Li is already inserted into a metal fluoride, thus forming a mixture of LiF and metal nanoparticles.

Figure 28:
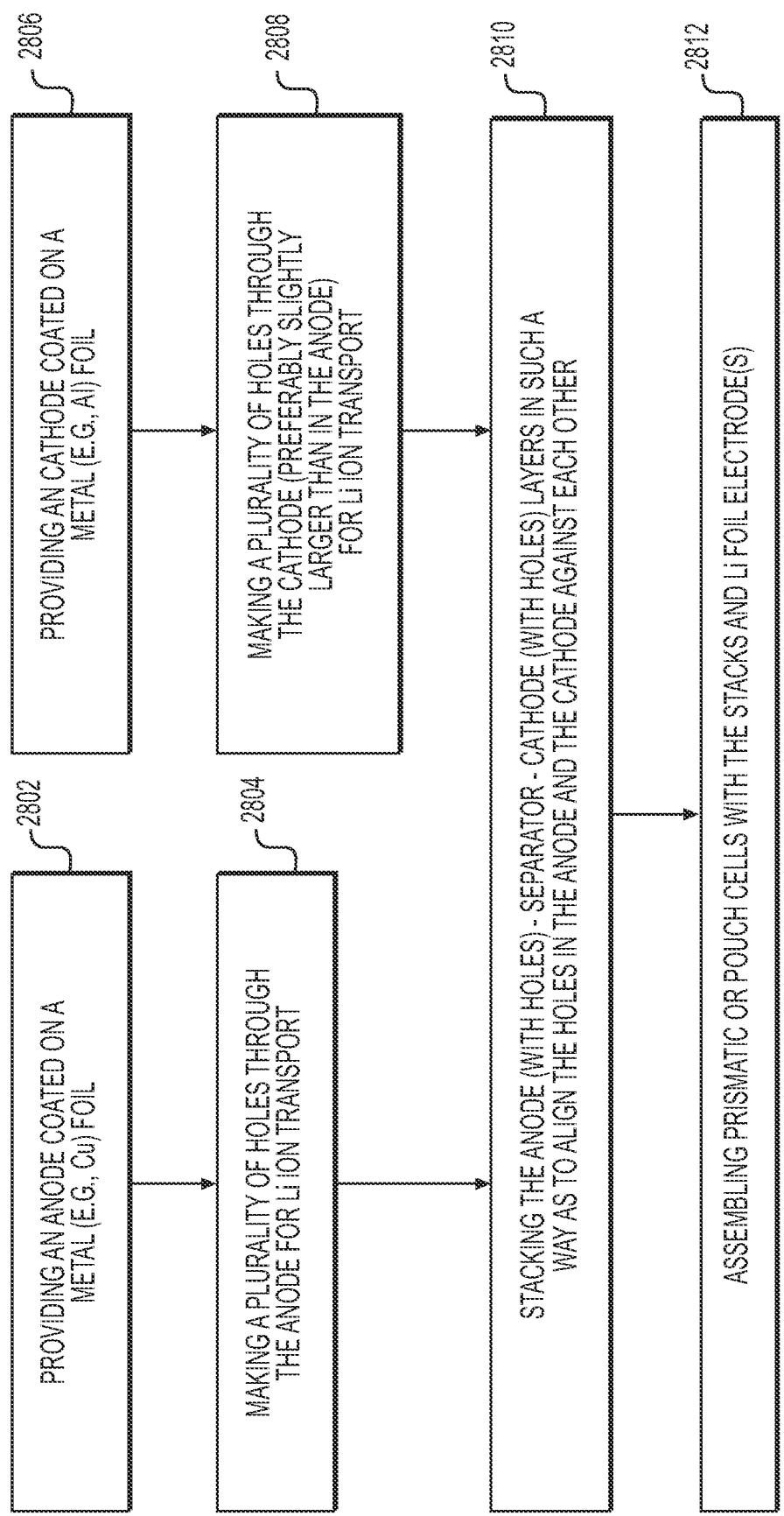
FIG. 28 illustrates an example flow chart explaining method(s) of forming of a cell with metal-ion (such as Li-ion) permeable electrodes.

FIG. 28 presents an alternative route for the formation of a cell with metal-ion (such as Li-ion) permeable electrodes. Instead of producing Li-ion permeable current collectors, this method involves making holes through each electrode after the active material coating formations. As shown, in this example, an anode may be coated on a metal (e.g., Cu) foil (block 2802) (with or without reinforcing filler (nano) particles) and a plurality of holes made through the anode for Li-ion transport (block 2804). Similarly, a cathode may be coated on a metal (e.g., Al) foil (block 2806) (with or without reinforcing filler (nano)particles) and a plurality of holes made through the cathode (preferably slightly larger than in the anode) for Li-ion transport (block 2808). The anode (with holes), separator, and cathode (with holes) layers may then be stacked in such a way as to align the holes in the anode and the cathode against each other (block 2810). Prismatic or pouch cells may then be assembled with the produced stacks and Li foil electrode(s) (block 2812).

The areal fraction of the produced holes may generally be in the range from 0.001% to 10%, preferably from 0.05% to 3%. A smaller hole fraction may slow down the doping process. A larger hole fraction will reduce the energy density of a cell. Holes may be ordered and produce, for example, a hexagonal, rectangular, or square pattern. The spacing between the holes may vary, depending on the application and the porosity of the separator, porosity of the electrode, electrolyte conductivity, and other factors. In general, it may be advantageous for the "doping" process to not take more than around 10 days. In most cell configurations and compositions, this limits the spacing between the individual holes to less than around 2 cm. In order to avoid Li plating on the anode, it may be advantageous for the holes on the anodes and the cathodes to be aligned relative to each other. Since perfect alignment of the holes in the electrode stack is difficult to achieve, the anode holes may be made smaller than the cathode holes. The size difference may depend on the precision of the cell assembling instruments. With the current state of the majority of cell assembling tools, it may be advantageous for the anode holes to be at least around 40 microns in diameter larger than the cathode holes. Further technological improvements in the future may reduce these differences significantly.

In one specific example (for illustration purposes only), the anode holes may be 0.3 mm in diameter, spaced 2 mm apart from other anode holes on the same electrode; the cathode holes may be 0.2 mm in diameter, spaced 2 mm apart from other cathode holes on the same electrode; with holes on each electrode vertically aligned with each other within the stack.

In another specific example (for illustration purposes only), the anode holes may be 1 mm in diameter, spaced 10 mm apart from other anode holes on the same electrode; the cathode holes may be 0.6 mm in diameter, spaced 8 mm apart from other cathode holes on the same electrode; with holes on each electrode vertically aligned with each other within the stack.

Figure 29:
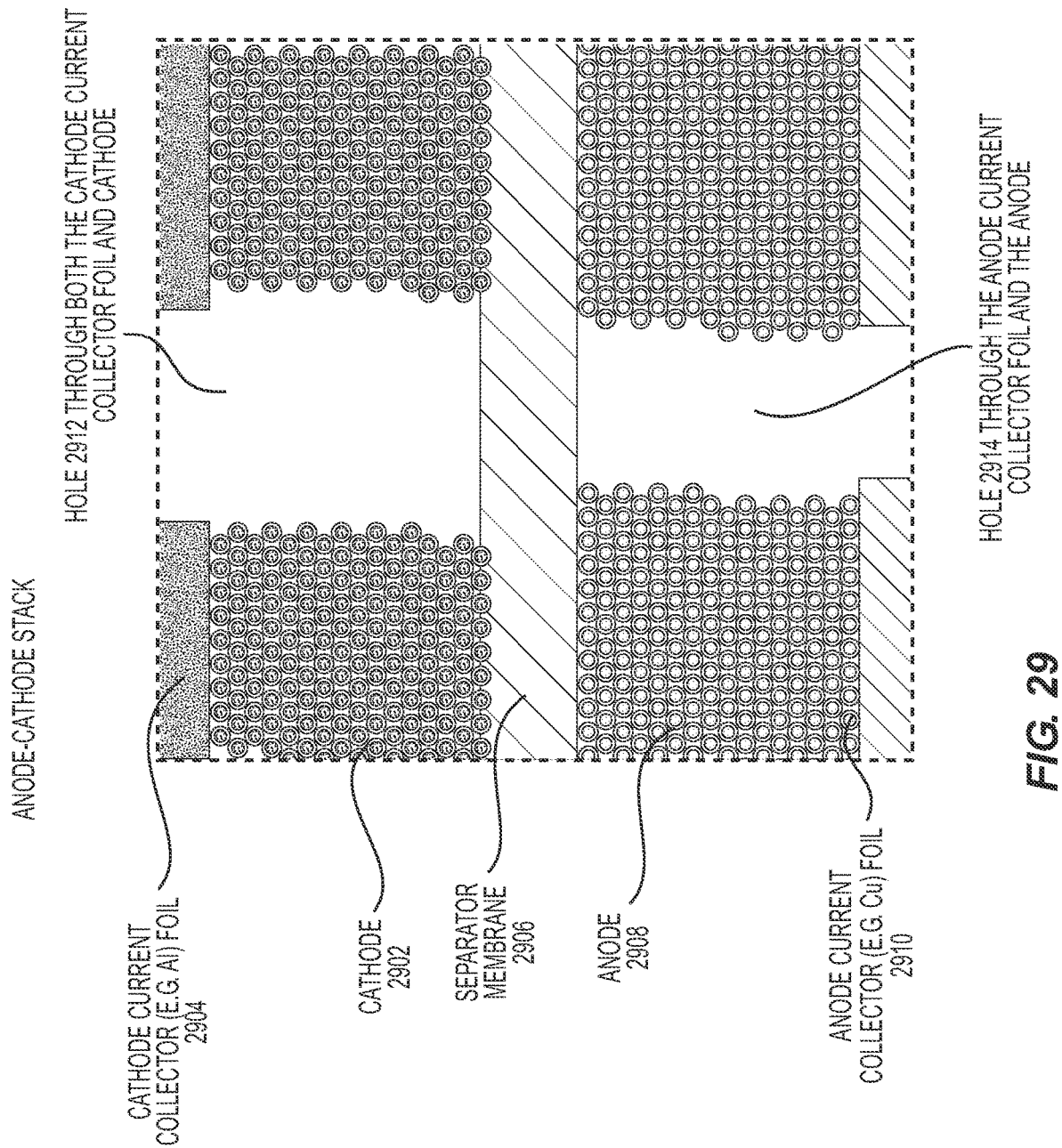
FIG. 29 illustrates an exemplary building block of the Li-ion permeable electrode stack with aligned holes pinning though both the anode and the cathode.

FIG. 29 illustrates a section of cathode-anode stack with aligned holes and a separator in between. As shown, the cathode-anode stack may include a cathode 2902 and cathode current collector (e.g., Al) foil 2904, a separator membrane 2906, and an anode 2908 and anode current collector (e.g., Cu) foil 2910. The anode may comprise Si as a high capacity anode material. As is further shown, in this example, a hole 2912 is created through both the cathode current collector foil and the cathode. Similarly, a hole 2914 is also created through the anode current collector foil and the anode. The hole(s) may be cylindrical in shape. In some designs, the hole in the anode may be smaller than that in the cathode.

In some designs, even if the produced holes within the anode and cathode are not aligned, plating may be avoided if the size of the holes in the anode is relatively small. In other embodiments, holes within the anode and cathode are not aligned, but sufficiently small in the anode to avoid plating. The critical size of such misaligned holes depends, for example, on the particular anode, cell operating temperature, and maximum current rate, but, in most cases, the anode hole size (e.g., diameter, in the case of cylindrical holes) should preferably be at less than one-half of the thickness of the electrode to avoid plating.

Figure 30:
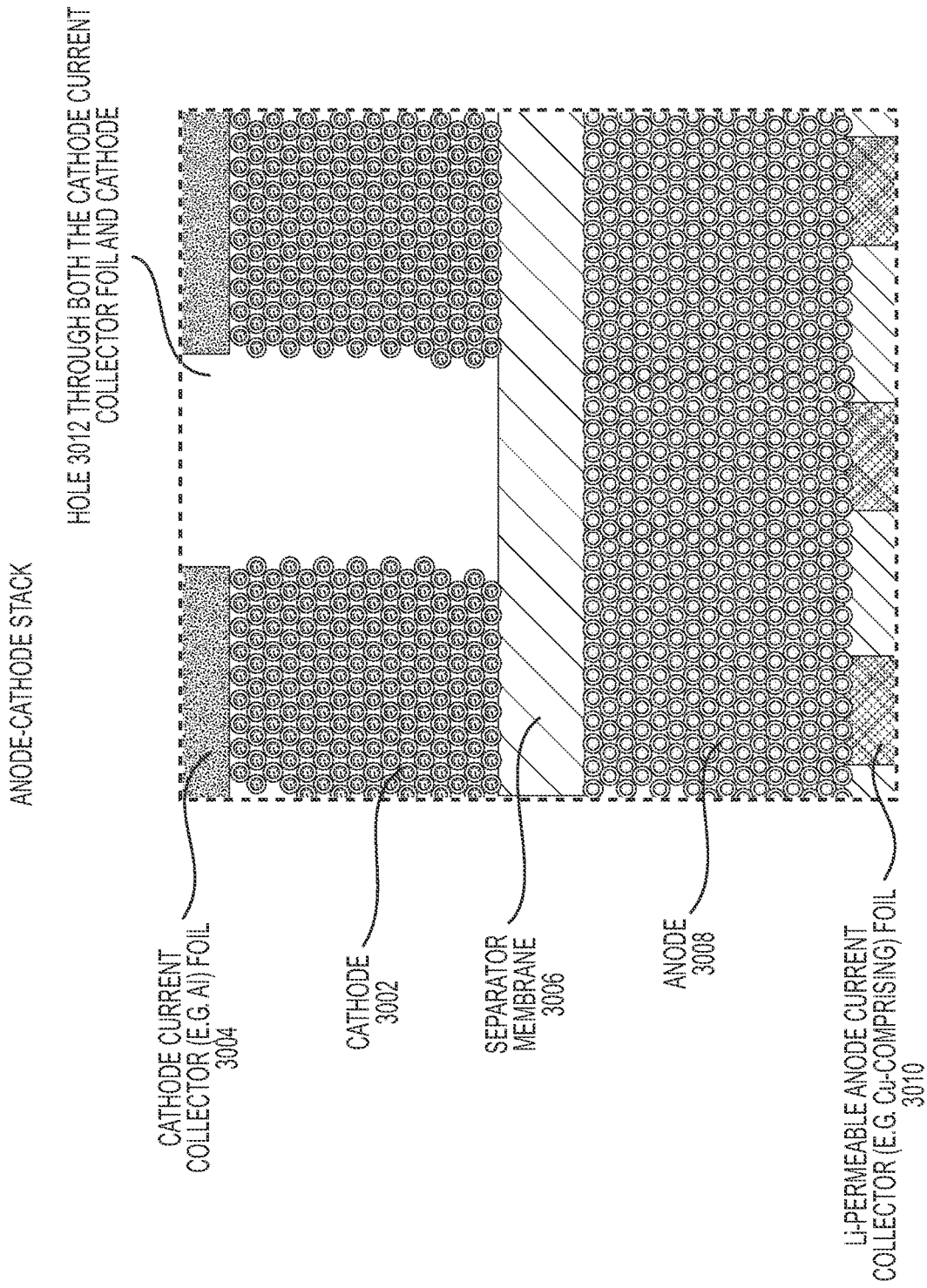
FIG. 30 illustrates an exemplary building block of the Li-ion permeable electrode stack, where the cathode contains holes for Li permeability and the anode is deposited on a Li-ion permeable current collector foil.

FIG. 30 illustrates a section of another cathode-anode stack with a composite anode current collector and holes that penetrate the cathode active material coating. As shown, the cathode-anode stack may include a cathode 3002 and cathode current collector (e.g., Al) foil 3004, a separator membrane 3006, and an anode 3008 and anode current collector (e.g., Cu) foil 3010. The anode may comprise Si as a high capacity anode material. As is further shown, in this example, the Li-ion permeable anode current collector may be a composite (such as those described above) or contain relatively small (e.g., 0.0001-0.01 mm) through pores, while the Li-ion permeable cathode current collector may contain large (e.g., 0.01-1 mm) holes 3012, which may also penetrate the cathode active material coating. The relatively small (e.g., 0.0001-0.01 mm) through pores of the anode current collector may be produced by at least partial filling of the larger pores (0.01-3 mm) with the particles or particle-binder mixture. In some examples, it may be advantageous for at least some of such particles (or binder) to be electrically conductive. Examples of suitable conductive particles include various carbon particles (e.g., graphite, carbon black, carbon flakes, disordered carbon, porous carbon, graphene, nanotubes, etc.).

In the case of a Li-ion battery, it may be important that Li plating on the anode is avoided. Therefore, the opposite situation (e.g., when the Li-ion permeable anode contains large holes though the whole electrode, but when the Li-ion permeable cathode does not contain such large holes) is typically not attractive. However, in other battery chemistries (for example, when such plating is not feasible), the use of an ion-permeable anode that contains large holes though the whole electrode in combination with an ion-permeable cathode that does not contain such large holes may be advantageous in some applications.

Figure 31:
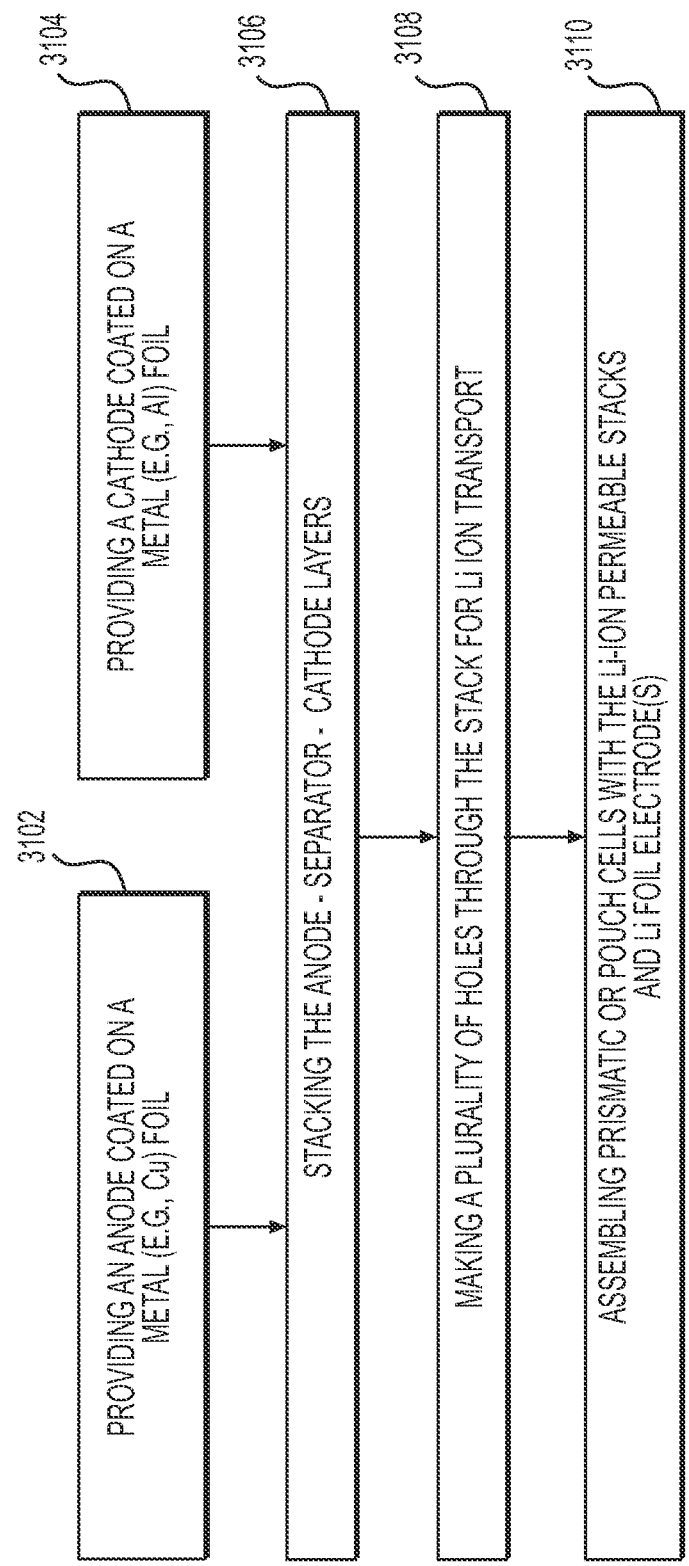
FIG. 31 illustrates an exemplary flow chart explaining another method(s) of manufacturing Li-ion permeable electrode stack(s).

FIG. 31 illustrates another alternative route for the formation of a cell with metal-ion (such as Li-ion) permeable electrodes. Instead of producing holes in individual components and assembling them into cells, this method involves making holes through the stack composed of the anode-cathode-separator (layers). In this case, a high degree of vertical pore alignment can be achieved and significant differences in the anode and cathode hole diameters are no longer needed. In more detail, the illustrated method may include providing or otherwise obtaining an anode coated on a metal (e.g., Cu) foil (block 3102) and a cathode coated on a metal (e.g., Al) foil (block 3104). The anode, separator, and cathode layers may be stacked (block 3106). A plurality of holes through the stack may be created for Li-ion transport (block 3108). Prismatic or pouch cells may then be assembled with the Li-ion permeable stacks and Li-foil electrode(s) (block 3110).

Figure 32:
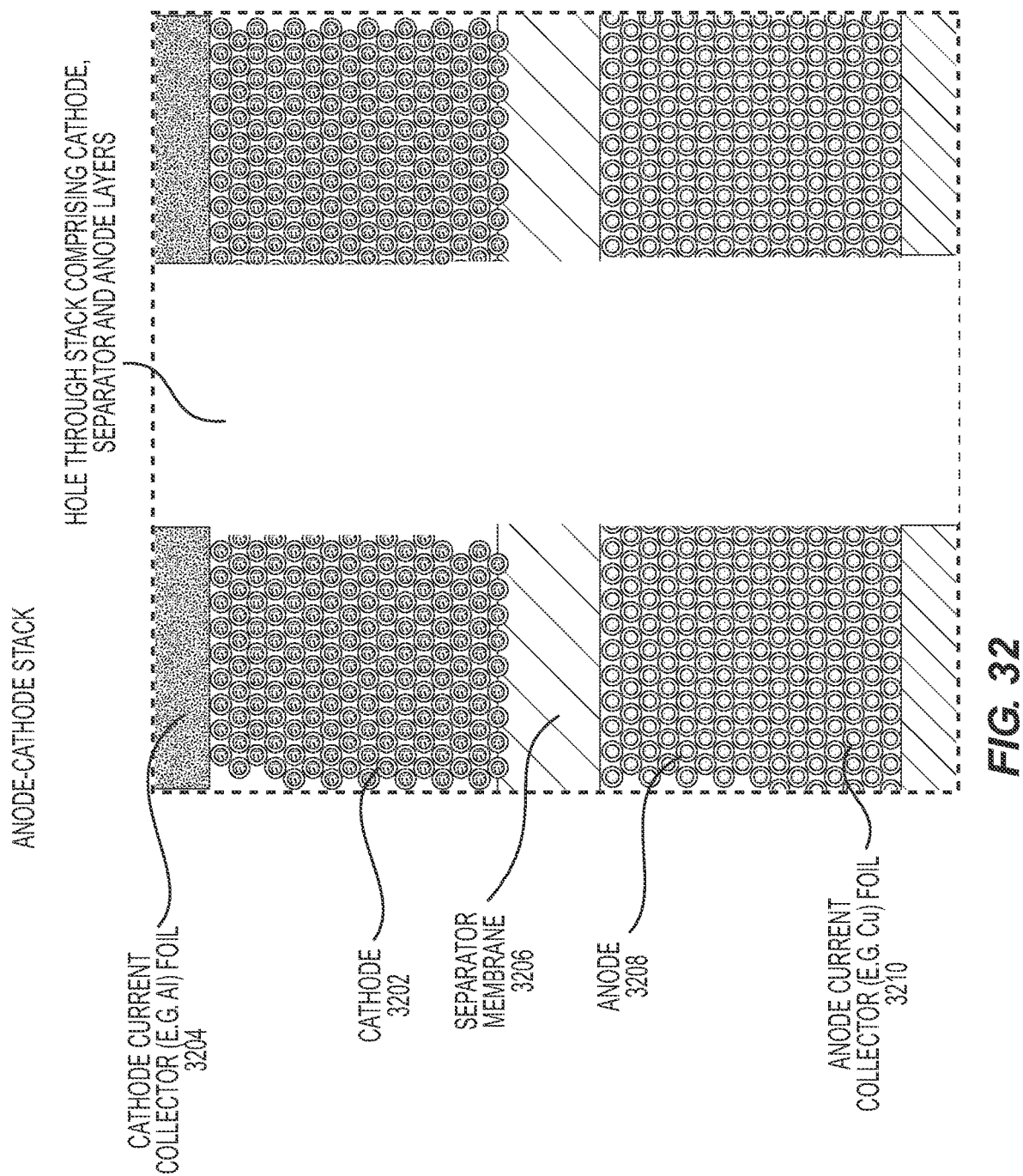
FIG. 32 illustrates an exemplary building block of the electrode stack, produced according to flow chart of FIG. 31.

FIG. 32 illustrates a section of another cathode-anode-separator stack with holes through it. As shown, the cathode-anode stack may include a cathode 3202 and cathode current collector (e.g., Al) foil 3204, a separator membrane 3206, and an anode 3208 and anode current collector (e.g., Cu) foil 3210. The anode may comprise Si as a high capacity anode material. As is further shown, in this example, a hole 3212 is created through the stack and constituent cathode, separator, and anode layers. The hole may be cylindrical in shape.

In this design it may be important that manufacturing the holes into the electrode stack(s) does not induce significant deformation within the electrodes (e.g., near the edges of the holes) and does not electrically connect the anode and cathode layers. The quality of the holes thus becomes particularly important. To achieve such a high quality, a combination of mechanical punching or drilling and laser drilling techniques may be used. The surface of the holes may also be coated with another material (e.g., an electrical insulator layer, such as a Li-ion permeable ceramic or Li-ion permeable polymer layer) in order to further prevent formation of electrical shorts during cycling.

It may also be important that the formation of holes within the electrodes or within the electrode stacks does not leave any electrical residue or debris, because these may induce internal short-circuiting within the cell, which may lead to thermal runaway.

Similarly, it may be important that the formation of holes within the electrodes or within the electrode stacks does not induce re-deposition of either the active material or the metals onto the electrode surface. For quality control or protection purposes, the surface of the electrode may be covered with a protective material during hole formation procedures.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A Li-ion battery cell, comprising:
   a composite current collector comprising pores;
   a second current collector;
   a Li-ion permeable anode on the composite current collector;
   a Li-ion permeable cathode on the second current collector;
   an electrolyte comprising an organic solvent ionically coupling the anode and the cathode; and
   a separator electrically separating the anode and the cathode;
   wherein the anode comprises a composite active material composition, the composite active material composition comprising first active material particles that exhibit specific capacity of at least 400 mAh/g and second active material particles comprising graphite that exhibit specific capacity that is less than or equal to 372 mAh/g; and
   wherein at least some of the second active material particles are in the pores of the composite current collector as part of a filler material;
   wherein at least some of the first active material particles are electrically connected to the composite current collector and are outside of the pores of the composite current collector; and
   wherein the pores are smaller than the first active material particles.

2. The Li-ion battery cell of claim 1, wherein the anode comprises Si.

3. The Li-ion battery cell of claim 1, further comprising:
   a high-capacity Li composition for providing Li ions to the anode and/or the cathode;
   wherein the high-capacity Li composition exhibits a volumetric capacity in excess of 1000 mAh/cc.

4. The Li-ion battery cell of claim 1, wherein the Li-ion battery cell is a cylindrical cell.

5. The Li-ion battery cell of claim 1, wherein the Li-ion battery cell is a pouch cell or a prismatic cell.

6. The Li-ion battery cell of claim 1, wherein the composite current collector comprises a metal, and the metal is Cu.

7. The Li-ion battery cell of claim 1, wherein the second current collector comprises a metal, and the metal is Al.

8. The Li-ion battery cell of claim 1, wherein the composite current collector is produced using a process that comprises electrodeposition.

9. The Li-ion battery cell of claim 1, wherein the filler material is separate from the electrolyte, ionically conductive and Li ions are permeable through the composite current collector at least via the filler material.

10. The Li-ion battery cell of claim 1, wherein the filler material further comprises a polymer filler, a conductive carbon filler, and/or a ceramic filler.

11. The Li-ion battery cell of claim 1, wherein the filler material further comprises a polymer filler comprising polymer fibers.

12. The Li-ion battery cell of claim 1, wherein:
    the filler material further comprises a polymer filler comprising a polymer; and
    the polymer includes repeating units selected from ethylene glycol, butadiene, acrylonitrile, acrylate, and methacrylate.

13. The Li-ion battery cell of claim 1, wherein:
    the filler material further comprises a polymer filler; and
    the polymer filler is swellable in the organic solvent.

14. The Li-ion battery cell of claim 1, wherein:
    the filler material further comprises a polymer filler; and
    the polymer filler exhibits ionic conductivity of at least 10-6 S/cm when exposed to the Li-ion battery cell electrolyte.

15. The Li-ion battery cell of claim 1, wherein:
    the filler material further comprises a conductive carbon filler; and
    the conductive carbon filler comprises carbon fibers, carbon nanotubes, graphene, or any combination thereof.

16. The Li-ion battery cell of claim 1, wherein:
    the filler material further comprises a ceramic filler; and
    the ceramic filler comprises a solid electrolyte material.

17. The Li-ion battery cell of claim 1, wherein:
    the filler material further comprises a ceramic filler; and
    the ceramic filler comprises ceramic particles of an elongated shape.

18. The Li-ion battery cell of claim 1, wherein the composite current collector (i) exhibits a thickness below about 20 microns and (ii) comprises pores or through channels making up from about 1% to about 20% of a cross-sectional area of the composite current collector.

19. The Li-ion battery cell of claim 1, wherein the composite current collector comprises pores with a size in the range of about 0.01 to about 20 microns.

20. The Li-ion battery cell of claim 1, wherein the composite current collector comprises a porous metal that comprises the pores.

21. The Li-ion battery cell of claim 1, wherein the composite current collector comprises a polymer.

* * * * *